US008851707B2

(12) United States Patent
Peck

(10) Patent No.: US 8,851,707 B2
(45) Date of Patent: Oct. 7, 2014

(54) HIGHLY COLLIMATING REFLECTOR LENS OPTIC AND LIGHT EMITTING DIODES

(75) Inventor: John Patrick Peck, Manasquan, NJ (US)

(73) Assignee: Dialight Corporation, Farmingdale, NJ (US)

( * ) Notice: Subject to any disclaimer, the term of this patent is extended or adjusted under 35 U.S.C. 154(b) by 54 days.

(21) Appl. No.: 12/815,642

(22) Filed: Jun. 15, 2010

(65) Prior Publication Data

US 2011/0305014 A1    Dec. 15, 2011

(51) Int. Cl.
| | | |
|---|---|---|
| F21S 4/00 | (2006.01) | |
| F21V 21/00 | (2006.01) | |
| G02B 19/00 | (2006.01) | |
| F21V 5/02 | (2006.01) | |
| F21V 13/04 | (2006.01) | |
| F21V 5/04 | (2006.01) | |
| F21Y 103/02 | (2006.01) | |
| F21V 7/00 | (2006.01) | |
| F21Y 101/02 | (2006.01) | |
| F21W 111/00 | (2006.01) | |
| B64F 1/20 | (2006.01) | |
| F21W 111/06 | (2006.01) | |

(52) U.S. Cl.
CPC ........ *G02B 19/0066* (2013.01); *G02B 19/0023* (2013.01); *B64D 2203/00* (2013.01); *F21Y 2103/022* (2013.01); *F21V 7/0008* (2013.01); *F21V 5/02* (2013.01); *F21V 13/04* (2013.01); *F21Y 2101/02* (2013.01); *G02B 19/0019* (2013.01); *F21V 7/0025* (2013.01); *F21W 2111/00* (2013.01); *F21V 5/045* (2013.01); *B64F 1/20* (2013.01); *F21W 2111/06* (2013.01); *Y10S 362/80* (2013.01)
USPC ................. 362/249.02; 362/311.02; 362/800

(58) Field of Classification Search
CPC ... F21V 7/0008; F21V 7/0025; F21V 7/0058; F21V 7/0066; F21V 13/04; F21W 2111/06; G02B 19/0066; G02B 27/0916; G02B 27/0922
USPC .................. 362/249.02, 311.02, 545, 800
See application file for complete search history.

(56) References Cited

U.S. PATENT DOCUMENTS

| | | | |
|---|---|---|---|
| 2,215,900 A | 9/1940 | Bitner | |
| 2,356,654 A | 8/1944 | Cullman | |

(Continued)

FOREIGN PATENT DOCUMENTS

| | | |
|---|---|---|
| DE | 20 2009 006868 U1 | 8/2009 |
| EP | 1 698 823 A2 | 9/2006 |

(Continued)

OTHER PUBLICATIONS

Partial European Search Report for EP 06110876, Mar. 30, 2007.

(Continued)

*Primary Examiner* — Jason Moon Han

(57) ABSTRACT

The present invention is directed to a beacon light with a light emitting diode (LED) optic. In one embodiment, the LED optic includes at least one LED comprising an LED plane, a first reflector positioned above the LED plane and comprising a curved cross-section, wherein the at least one LED is positioned approximately 90 degrees with respect to an optical axis of the first reflector and at least one second reflector positioned above the LED plane.

21 Claims, 19 Drawing Sheets

(56) References Cited

U.S. PATENT DOCUMENTS

| | | | |
|---|---|---|---|
| 4,767,172 | A | 8/1988 | Nichols et al. |
| 5,155,666 | A | 10/1992 | Radford et al. |
| 5,343,330 | A | 8/1994 | Hoffman et al. |
| 5,526,190 | A | 6/1996 | Hubble, III et al. |
| 5,642,933 | A | 7/1997 | Hitora |
| 5,769,532 | A | 6/1998 | Sasaki |
| 5,800,051 | A | 9/1998 | Gampe et al. |
| 5,813,743 | A | 9/1998 | Naka |
| 5,929,788 | A | 7/1999 | Vukosic |
| 6,183,100 | B1 | 2/2001 | Suckow et al. |
| 6,238,073 | B1 * | 5/2001 | Ito et al. ............... 362/544 |
| 6,425,678 | B1 | 7/2002 | Verdes et al. |
| 6,464,373 | B1 | 10/2002 | Petrick |
| 6,474,852 | B1 | 11/2002 | Ohkohdo et al. |
| 6,533,446 | B2 | 3/2003 | Chen et al. |
| 6,637,921 | B2 | 10/2003 | Coushaine |
| 6,717,526 | B2 | 4/2004 | Martineau et al. |
| 6,762,695 | B1 | 7/2004 | Eslambolchi et al. |
| 6,857,762 | B2 | 2/2005 | Shimokawa et al. |
| 6,867,710 | B2 | 3/2005 | Wobben |
| 6,948,830 | B1 | 9/2005 | Petrick |
| 7,160,004 | B2 | 1/2007 | Peck |
| 7,270,449 | B2 | 9/2007 | Uke |
| 7,401,958 | B2 * | 7/2008 | Okada ............... 362/517 |
| 7,461,952 | B2 | 12/2008 | Trenchardl et al. |
| 7,481,561 | B2 * | 1/2009 | Okuda ............... 362/539 |
| 7,568,821 | B2 | 8/2009 | Peck et al. |
| 7,758,210 | B2 | 7/2010 | Peck |
| 7,832,908 | B2 | 11/2010 | Peck et al. |
| 2001/0028559 | A1 | 10/2001 | Tenmyo |
| 2002/0122309 | A1 | 9/2002 | Abdelhafez et al. |
| 2003/0072150 | A1 | 4/2003 | Rizkin et al. |
| 2003/0156414 | A1 | 8/2003 | Tenmyo |
| 2003/0193807 | A1 | 10/2003 | Rizkin |
| 2003/0202241 | A1 | 10/2003 | Blumel |
| 2004/0042212 | A1 | 3/2004 | Du et al. |
| 2004/0057234 | A1 | 3/2004 | Mohacsi |
| 2004/0085764 | A1 | 5/2004 | Martin et al. |
| 2004/0114355 | A1 | 6/2004 | Rizkin et al. |
| 2004/0207532 | A1 | 10/2004 | Smithson |
| 2005/0093715 | A1 | 5/2005 | Pederson |
| 2005/0094393 | A1 | 5/2005 | Czjkowski |
| 2005/0128744 | A1 | 6/2005 | You et al. |
| 2005/0156531 | A1 | 7/2005 | Young |
| 2005/0157490 | A1 | 7/2005 | Klose |
| 2006/0012990 | A1 | 1/2006 | Walser et al. |
| 2006/0067079 | A1 | 3/2006 | Noh et al. |
| 2006/0176702 | A1 | 8/2006 | Shen et al. |
| 2006/0198141 | A1 | 9/2006 | Peck et al. |
| 2006/0198148 | A1 | 9/2006 | Peck |
| 2006/0291201 | A1 | 12/2006 | Smith |
| 2007/0211487 | A1 | 9/2007 | Sormani |
| 2008/0192480 | A1 | 8/2008 | Rizkin et al. |
| 2008/0285295 | A1 | 11/2008 | Schug |
| 2010/0008082 | A1 | 1/2010 | Brass et al. |

FOREIGN PATENT DOCUMENTS

| | | |
|---|---|---|
| EP | 1 698 823 A3 | 7/2007 |
| FR | 2 936 297 A1 | 3/2010 |
| JP | 6333879 | 2/1988 |
| JP | 4138438 | 5/1992 |
| JP | S63-33879 | 2/1998 |
| WO | WO 01/86198 A1 | 11/2001 |

OTHER PUBLICATIONS

PCT Search Report and Written Opinion for PCT/US07/68967, Sep. 15, 2008.
Extended European Search Report for EP 06110676, Jun. 20, 2007.
Extended European Search Report for 07762201, Sep. 30, 2010.
Opposition against European Patent No. 1698823, Vereenigde, Jan. 21, 2011.
EP 1 698 823 text as filed, Mar. 3, 2006.
Print screens of web.archive.org of archived Dialight website Oct.-Dec. 2005.
E-mail dated Oct. 5, 2005 showing URL of Dialight's datasheet.
Letter of patentee of Sep. 2, 2008 to EPO.
Condensed catalogue AOL1000, dated 1998.
EP Communication: Third Party Observations in European Patent Application Serial No. EP 07762201.7, dated Jun. 11, 2013, consists of 4 pages.
International Search Report and Written Opinion for PCT/US11/40195; Oct. 3, 2011, copy consists of 12 unnumbered pages.
International Preliminary Report on Patentability (IPRP) for PCT/US2011/040195, Jan. 3, 2013, copy consists of 10 unnumbered pages.
First Examination Report for EP 07762201.7, Dec. 12, 2012, copy consists of 7 pages.
EP Extended Search Report for EP11796245.6, Sep. 26, 2013, 8 pgs.
Canadian Office Action for CA 2,802,803, Mar. 21, 2014, 2 pgs.
Detasheet MDTF604X002_B of Dialight, (Alleged date of reception by the EPO Jan. 1, 2011).
Print screen Orga file server, (Alleged date of reception by the EPO Jan. 1, 2011).
Photo of detail of Dialight product, (Alleged date of reception by the EPO Jan. 1, 2011).
Print screen of archived Dialight website showing datasheet file name, (Alleged reception by the EPO Jan. 1 2011).
Print screen of archived Dialight website showing URL which archive date of picture, (Alleged reception by the EPO Jan. 1, 2011).
Datesheet AOL1000, (Alleged reception by the EPO Jan. 1, 2011).
Drawing AOL1000, (Alleged reception by the EPO Jan. 1, 2011).
Photo or AOL1000, (Alleged reception by the EPO Jan. 1, 2011).

* cited by examiner

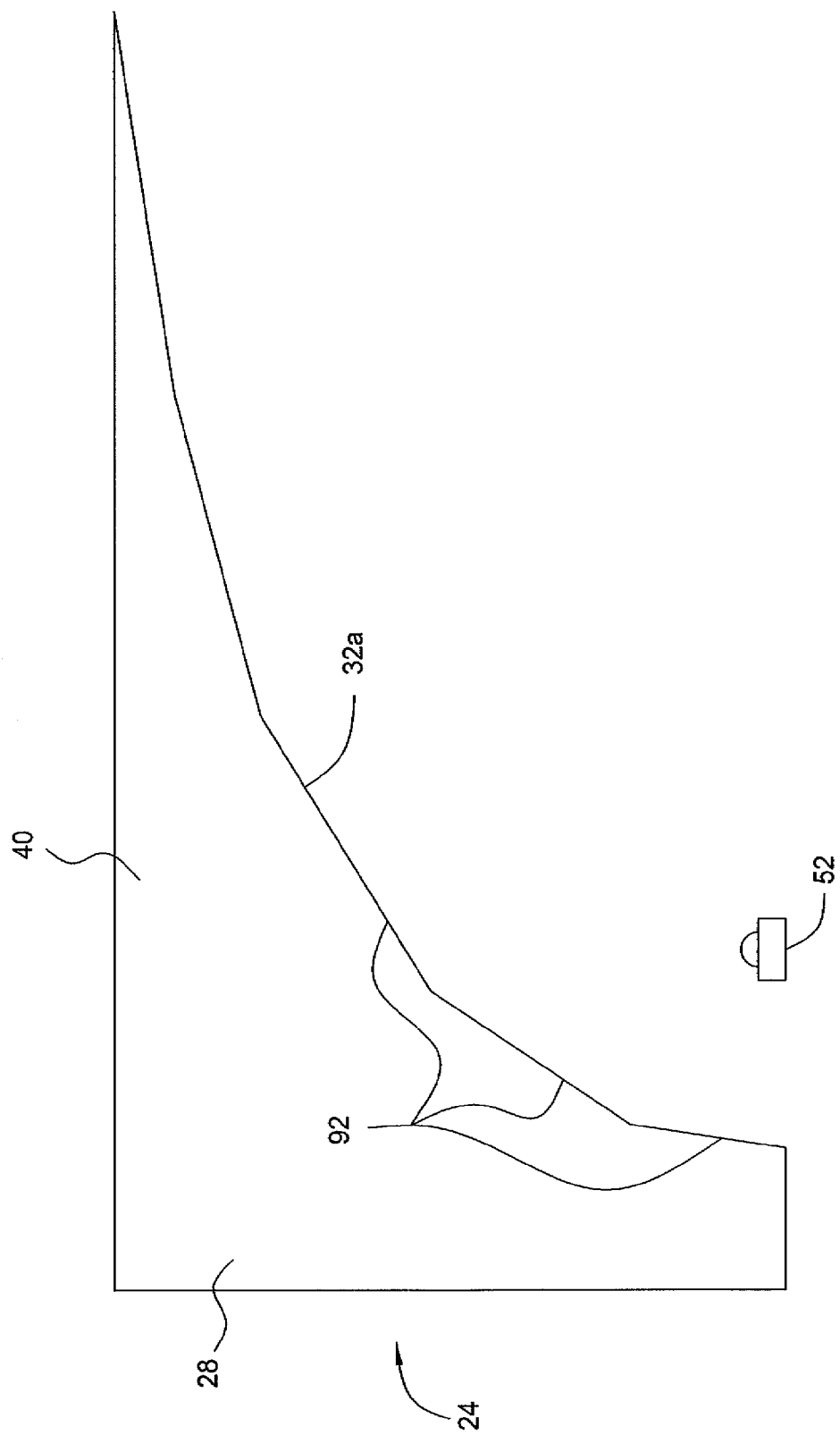

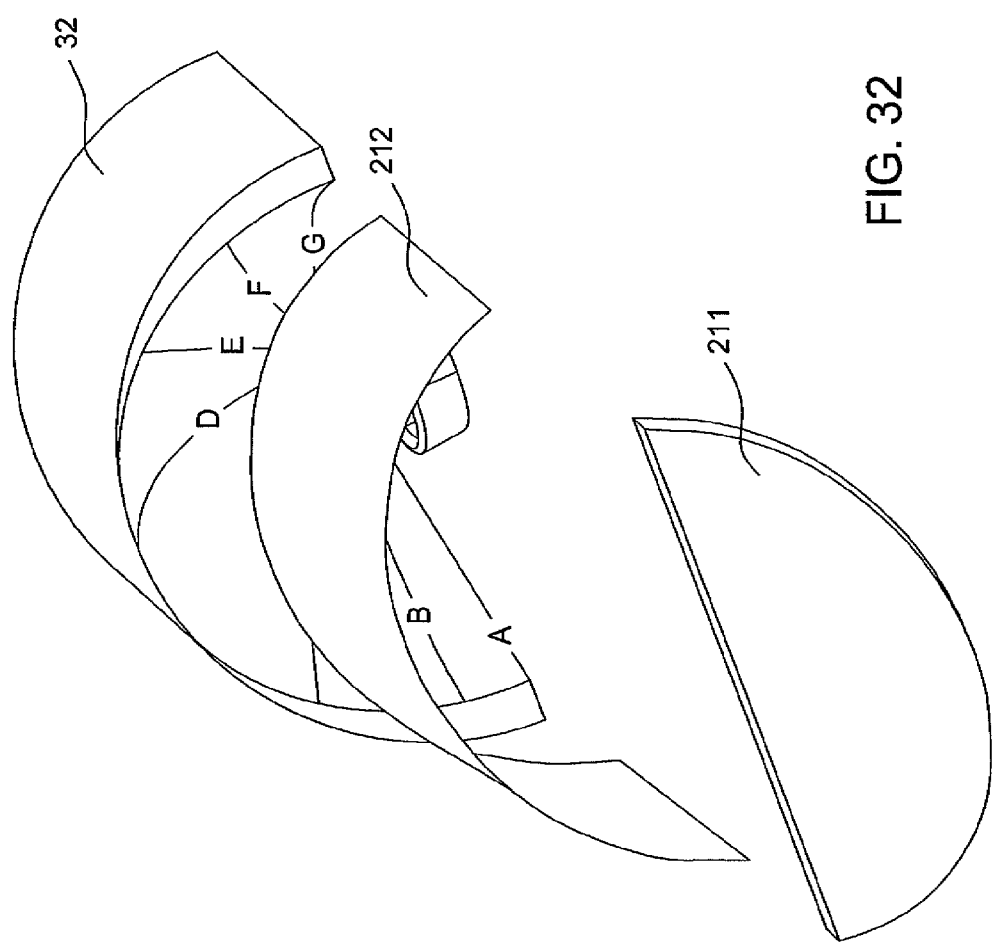

HIGHLY COLLIMATING REFLECTOR LENS OPTIC AND LIGHT EMITTING DIODES

BACKGROUND

A beacon light such as, for example, an aircraft obstruction light, can be used to mark an obstacle that may provide a hazard to aircraft navigation. Beacon lights are typically used on buildings, towers, and other structures taller than about 150 feet. Previous beacon lights generally exhibit relatively poor energy efficiency, which can prohibit the use of solar panels to power the beacon light. Previous beacon lights may also contribute to light pollution, i.e., direct light at angles undesirably above and below a specified plane. Previous beacon lights may also be too large and heavy for climbers to carry and therefore may require additional machinery or manpower to be hoisted into position.

Some beacon lights use a single reflector. However, not all of the light emitted from a light source is reflected in a single reflector design. As a result, the emitted light appears de-collimated as some of the light is emitted without reflection or collimation.

SUMMARY OF THE INVENTION

Various deficiencies of the prior art are addressed by the present invention, one embodiment of which is a beacon light having a light-emitting diode (LED) optic. In one embodiment, the LED optic includes at least one LED comprising an LED plane, a first reflector positioned above the LED plane and comprising a curved cross-section, wherein the at least one LED is positioned approximately 90 degrees with respect to an optical axis of the first reflector and at least one second reflector positioned above the LED plane.

In one embodiment, the present invention is generally directed towards an optic. In one embodiment, the optic comprises at least one light emitting means comprising a light emitting means plane, a first reflecting means positioned above the light emitting means plane and comprising a curved cross-section, wherein the at least one LED is positioned approximately 90 degrees with respect to an optical axis of the first reflector and at least one second reflecting means positioned above the light emitting means plane.

In one embodiment, a method comprises positioning at least one first reflector above an LED plane of at least one LED, wherein the first reflector comprises a curved-cross section and the at least one LED is positioned at about 90 degrees with respect to the first reflector, positioning at least one second reflector above the LED plane, positioning at least one lens below the LED plane and transmitting light from the at least one LED onto the at least one first reflector and the at least one second reflector, wherein the at least one lens collimates light reflected by the at least one second reflector.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 19 depicts a partial sectional side view of an embodiment of the LED reflector optic having a faceted reflecting surface;

FIG. 32 illustrates another embodiment of an LED reflector optic having a second reflector revolved around an LED.

To facilitate understanding, identical reference numerals have been used, where possible, to designate identical elements that are common to the figures.

DETAILED DESCRIPTION

Figure 1:
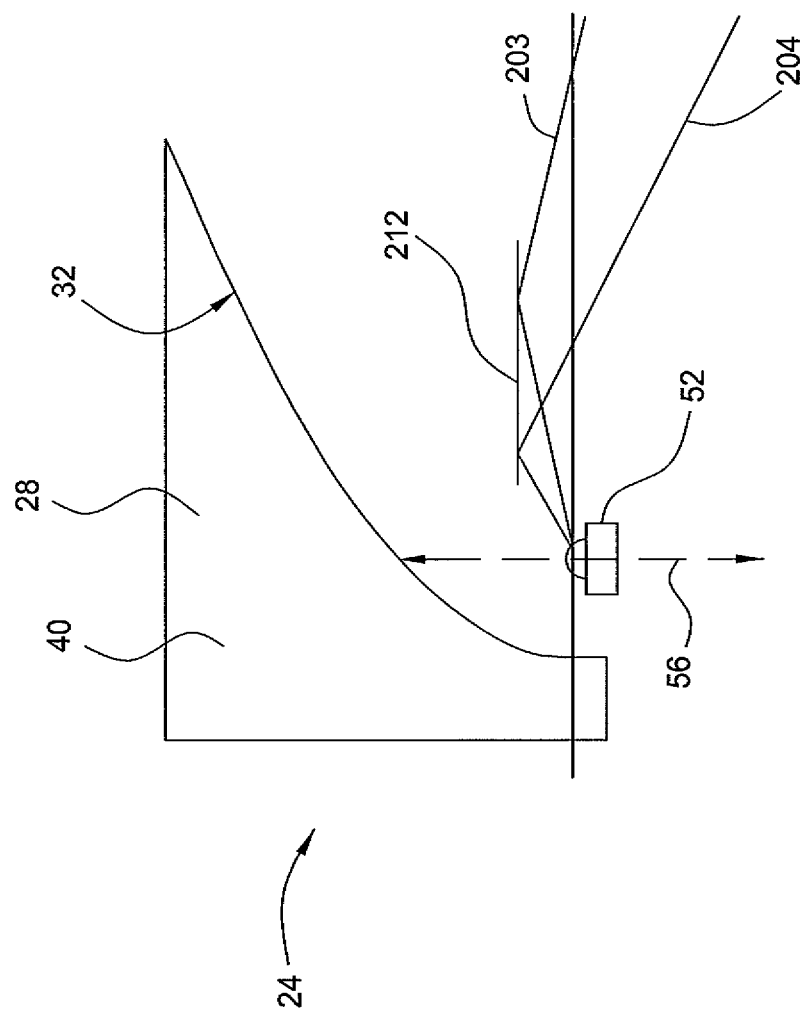
FIG. 1 depicts a side cross-sectional view of a highly collimating optic and light emitting diode (LED)

FIG. 1 depicts one embodiment of a side-cross-sectional view of a highly collimating optic and LED of the present disclosure. However, before a detailed discussion of FIG. 1 is provided, a detailed discussion of a reflector optic 24 is provided.

Figure 2:
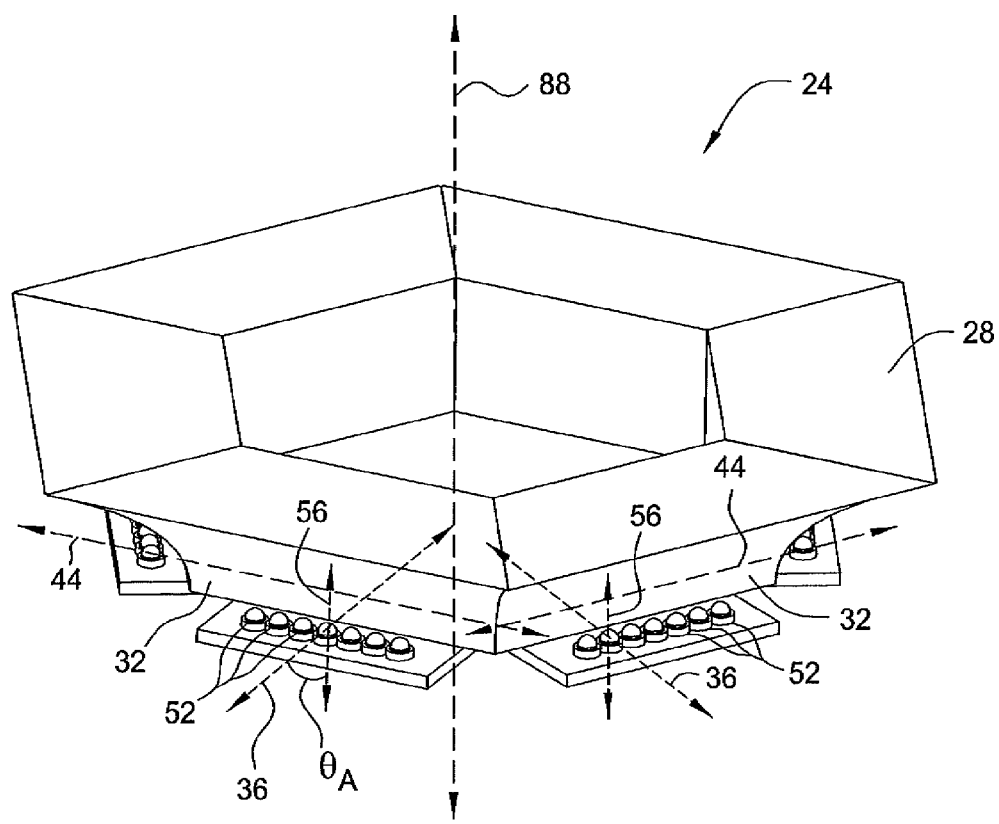
FIG. 2 depicts a perspective view of an embodiment of the LED reflector optic.

FIG. 2 depicts a perspective view of an embodiment of the LED reflector optic 24 according to the present invention. In one embodiment, the LED reflector optic 24 comprises a reflector 28 having a plurality of reflecting surfaces 32, i.e., a segmented reflector 28.

Figure 8:
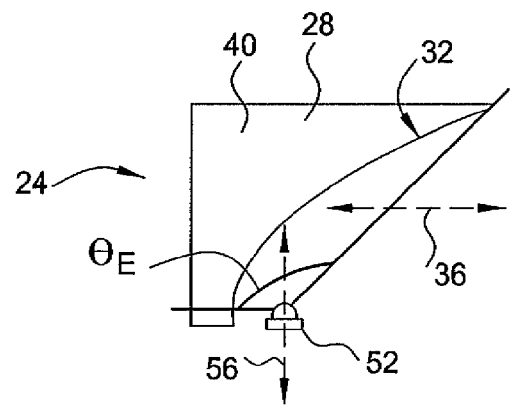
FIG. 8 depicts a partial sectional side view of an embodiment of the LED reflector optic depicted in FIG. 2.

Each reflecting surface 32 comprises a cross-section 40 (as depicted in FIG. 8) which is projected along an associated linear extrusion axis 44. In one embodiment, the linearly projected cross-section 40 comprises a conic section. A conic section provides an advantageous reflected light intensity distribution. In one embodiment, the cross-section 40 of the reflecting surface 32 comprises at least one of: a conic or a substantially conic shape. In one embodiment, the conic shape comprises at least one of: a hyperbola, a parabola, an ellipse, a circle, or a modified conic shape.

Each reflecting surface 32 has an associated optical axis 36. The optical axis 36 may be defined as an axis along which the main concentration of light is directed after reflecting off of the segmented reflector 28. In one embodiment, each reflecting surface 32 reflects a beam of light having an angular distribution horizontally symmetric to the associated optical axis 36, i.e. symmetric about the associated optical axis 36 in directions along the extrusion axis 44.

For each reflecting surface 32, the LED reflector optic 24 comprises at least one associated LED 52. The LED 52 has a central light-emitting axis 56, and typically emits light in a hemisphere centered and concentrated about the central light-emitting axis 56. The LED 52 is positioned relative to the associated reflecting surface 32 such that the central light-emitting axis 56 of the LED 52 is angled at a predetermined angle $\theta_A$ relative to the optical axis 36 associated with the reflecting surface 32. In a preferred embodiment, $\theta_A$ has a value of about 90°. In one embodiment, the about 90° has a tolerance of ±30°, i.e., from 60° to 120°.

Figure 3:
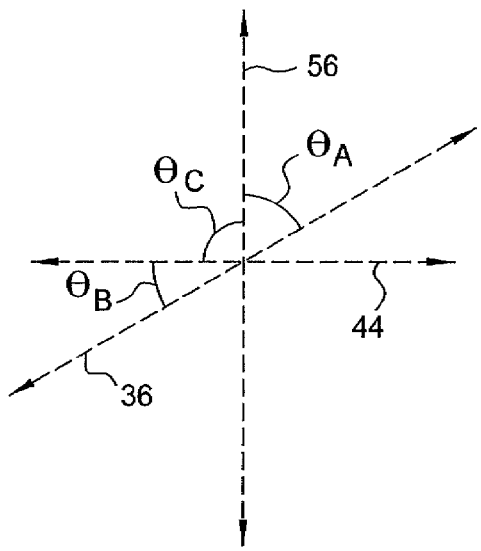
FIG. 3 depicts a perspective view of an embodiment of the angular relationship between the optical axis associated with the reflecting surface of the LED reflector optic depicted in FIG. 2, the central light emitting axis of the LED of the LED reflector optic, and the extrusion axis of the reflecting surface.

In one embodiment, for a specific reflecting surface 32 and associated LED 52, the central light-emitting axis 56 of the LED 52, the optical axis 36 associated with the reflecting surface 32, and the extrusion axis 44 of the reflecting surface 32 form orthogonal axes of a 3-axes linear coordinate system. Namely, the central light-emitting axis 56, the optical axis 36, and the extrusion axis 44 are mutually perpendicular. FIG. 3 depicts a representation of the mutually perpendicular relationship between the central light-emitting axis 56, the optical axis 36, and the extrusion axis 44. In FIG. 2, $\theta_B$, is the angle between the optical axis 36 and the extrusion axis 44, and $\theta_C$ is the angle between the central light emitting axis 56 and the extrusion axis 44. In one embodiment, the mutually perpendicular relationship between the central light-emitting axis 56, the optical axis 36, and the extrusion axis 44 is approximate. For example, each of the central light-emitting axis 56, the optical axis 36, and the extrusion axis 44 can be angled at 90° from each of the other two axes, with a tolerance, in one embodiment, of ±30°.

In one embodiment, for each reflecting surface 32, the LED reflector optic 24 comprises a plurality of associated LEDs 52. In one embodiment, the plurality of associated LEDs 52 are arranged along a line, as depicted in FIG. 2, parallel to the extrusion axis 44 of the reflecting surface 32. In one embodiment, the plurality of associated LEDs 52 are staggered about a line. For example, in one embodiment, the plurality of associated LEDs 52 are staggered about a line, with the staggering comprising offsetting the LEDs 52 from the line by a predetermined distance in alternating directions perpendicular to the line. Also, in one embodiment, the LED 52, or the plurality of LEDs 52, are positioned at the focal distance of the reflecting surface 32.

Figure 4:
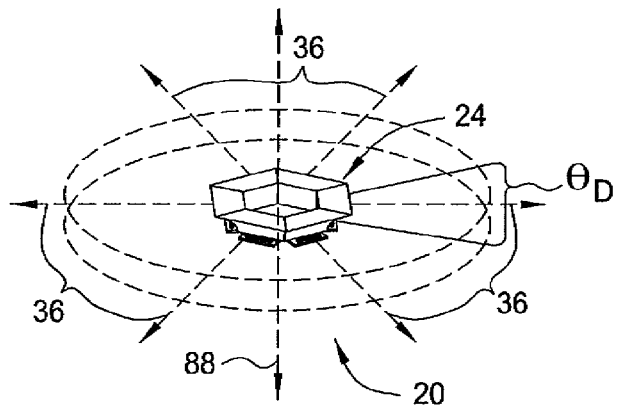
FIG. 4 depicts a partial perspective view of an embodiment of a beacon light.

FIG. 4 depicts a partial perspective view of an embodiment of the beacon light 20 in which the beacon light 20 emits light outward over a 360° angular distribution about a central axis 88 of the reflector 28 of the LED reflector optic 24. Such a 360° angular distribution of reflected light may be a requirement for the beacon light 20 to provide obstruction warning in all directions.

The light emitted from the beacon light 20 has a predetermined beam spread $\theta_D$, as depicted in FIG. 4. The beam spread $\theta_D$ is the angle, vertically perpendicular to the optical axes 36 of the reflecting surfaces 32, over which the intensity of the emitted light is greater than 50% of the peak intensity of the emitted light. In a preferred embodiment, the beacon light 20 has a beam spread $\theta_D$ of less than 3°. In another embodiment, the beacon light 20 has a beam spread $\theta_D$ of less than 10°.

Figure 5:
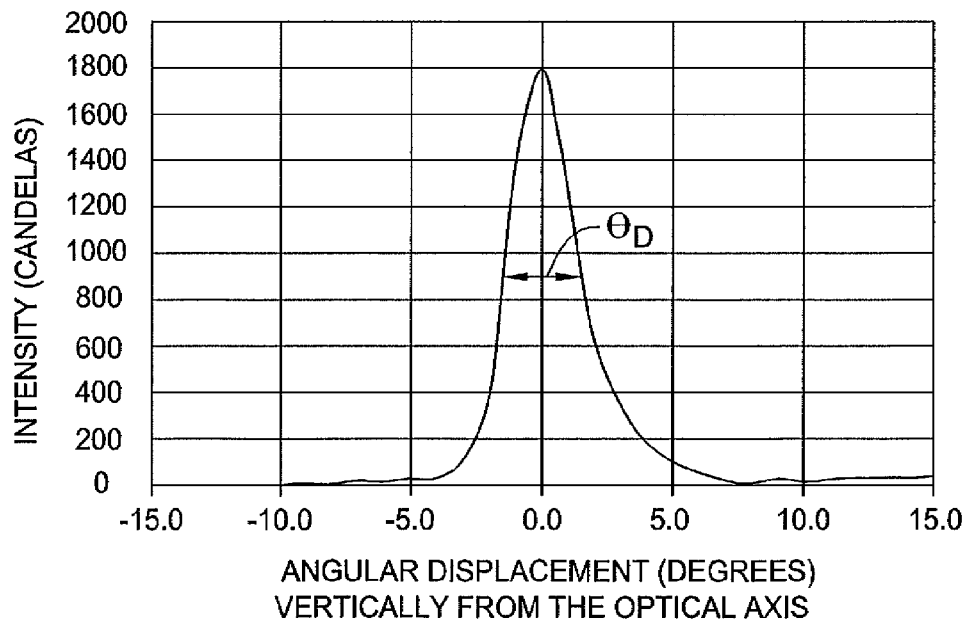
FIG. 5 is a graph depicting a representation of the intensity, versus angular displacement vertically from the optical axis, of light emitted from an embodiment of the beacon light.

FIG. 5 is a graph depicting a representation of the light intensity, versus angular displacement vertically perpendicular to the optical axes 36, emitted from an embodiment of the beacon light 20. FIG. 5 shows the beam spread $\theta_D$ for this embodiment is approximately 3°, i.e., about 1.5° on either side of a plane containing the optical axes 36.

Figure 6:
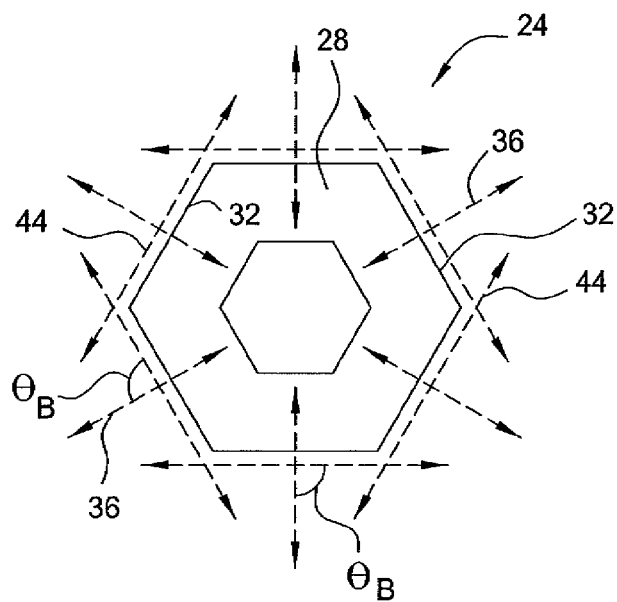
FIG. 6 depicts a sectional top view of an embodiment of the reflector of the LED reflector optic depicted in FIG. 2.

The plurality of reflecting surfaces 32 of the reflector 28 are arranged so that each of the associated extrusion axes 44 is angled relative to the extrusion axis 44 of another reflecting surface 32. In one embodiment, the plurality of extrusion axes 44 occupy a single plane and intersect each other to outline a polygon. Namely, a top view cross-section of the reflector comprises a perimeter which is a polygon. FIG. 6 depicts a sectional top view of an embodiment of the reflector 28, showing the plurality of associated extrusion axes 44 intersecting each other to form a hexagon. Such an embodiment achieves the 360° angular distribution, relative to the central axis 88 of the reflector 28, of light emitted from the LED reflector optic 24. Each reflecting surface 32 reflects light in the direction of the optical axis 36 associated with that reflecting surface 32, and through an angular distribution horizontally symmetric to and centered to the optical axis 36.

Although FIG. 6 depicts a polygon embodiment of the reflector 28 having six reflecting surfaces 32, in another polygon embodiment the reflector 28 has at least three reflecting surfaces 32.

Figure 7:
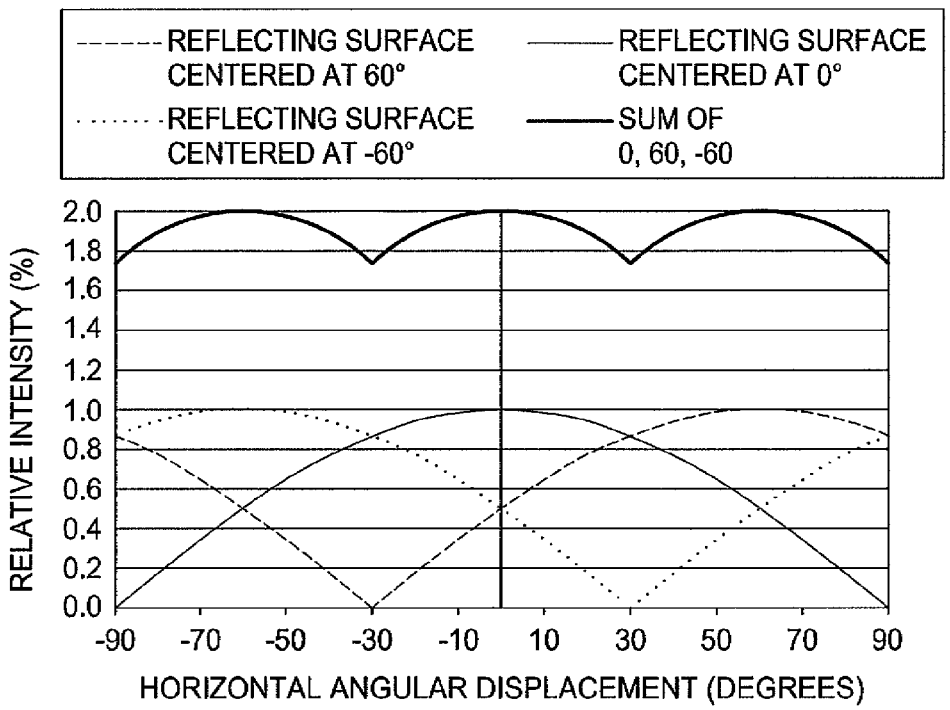
FIG. 7 is a graph depicting a representation of the relative intensity, versus angular displacement, of light reflected from three different adjacent reflecting surfaces, and the sum thereof, of an embodiment of the LED reflector optic depicted in FIG. 2.

In one embodiment, each horizontal angular distribution of reflected light associated with a specific reflecting surface 32 overlaps the horizontal angular distribution of reflected light associated with an adjacent reflecting surface 32. FIG. 7 is a graph depicting a representation of the relative intensity, versus horizontal angular displacement, of light reflected from three different adjacent reflecting surfaces 32, and the sum thereof. The thick solid line of FIG. 7 represents the overall intensity of light emitted from the LED reflector optic 24, including light reflected from all of the three adjacent reflecting surfaces 32. The thin solid line represents the intensity of light reflected from the reflecting surface 32 associated with the optical axis 36 about which the angular displacement of FIG. 7 is centered, i.e. the reflecting surface 32 having the optical axis at 0° as shown in FIG. 7. The dotted and dashed lines of FIG. 7 represent the intensity of light reflected from the two reflecting surfaces 32 adjacent and connected to the first reflecting surface 32. FIG. 7 shows that the light reflected from each reflecting surfaces 32 overlaps the light reflected from adjacent reflecting surfaces 32 to form an overall reflection of light from the reflector 28 which has a more uniform intensity profile, versus angular displacement, than the individual intensity profiles of light reflected from the individual reflecting surfaces 32.

In one embodiment, the intersection of the plurality of extrusion axes 44 does not necessarily outline a polygon. In one embodiment, light emitted from the LED reflector optic 24 does not have a 360° angular distribution relative to the central axis 88 of the reflector 28. Such an embodiment may instead achieve, for example, a 180° angular distribution.

In one embodiment, the plurality of reflecting surfaces 32 of the segmented reflector 28 are connected together.

The utilization of light emitted by the LED 52 by one embodiment of the LED reflector optic 24 provides an advantage of the present invention. To further understand this advantage, the utilization of light by one embodiment of the LED reflector optic 24 can be compared to the utilization of light in an alternative relative positioning of the LED 52 and the reflecting surface 32.

FIG. 8 depicts a partial sectional side view of an embodiment of the LED reflector optic 24. In the embodiment shown in FIG. 8, the reflecting surface 32 has a concave conic cross-section, and the central light-emitting axis 56 of the LED 52 is in the same plane as the shown cross-section. FIG. 8 also shows the angle $\theta_E$ over which light, emitted from the LED 52, is reflected by the reflecting surface 32.

Figure 9:
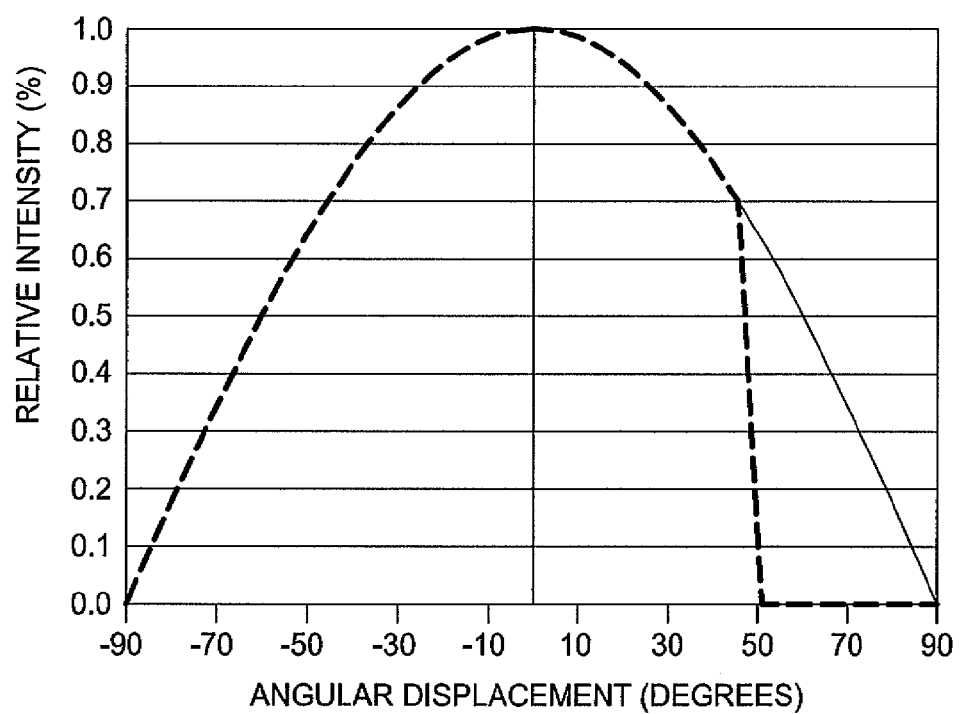
FIG. 9 is a graph depicting a representation of relative light intensity, versus angular displacement, for light typically emitted from the LED, and for light reflected by the embodiment of the LED reflector optic depicted in FIG. 8.

FIG. 9 is a graph depicting a representation of the relative intensity of light, versus angular displacement in the plane of FIG. 8, for light typically emitted by the LED 52, and for light reflected by the reflecting surface 32 of the LED reflector optic 24 shown in FIG. 8. The solid line of FIG. 9 represents the light intensity distribution typically emitted by the LED 52, i.e., without the reflecting surface 32 present, versus angular displacement relative to the central light emitting axis 56. The light intensity distribution emitted by the LED 52 is typically lambertian. However, other light intensity distributions may also benefit from the present invention. The light intensity distribution emitted by the LED 52 includes light over about 180°, i.e., about 90° on either side of the central light-emitting axis 56. The dotted line of FIG. 9 represents the portion of the light intensity distribution emitted by the LED 52 which is reflected by the reflecting surface 32 positioned relative to the LED 52 as shown in FIG. 8. The dotted line shows that light over the angle $\theta_E$, i.e., about 135°, of the angular distribution of the LED emission is reflected by the reflecting surface 32. The angle $\theta_E$ includes about 90° on one side of the central light-emitting axis 56 and about 45° on the other side of the central light-emitting axis 56. The portion of the LED emission which is reflected by the reflecting surface 32, i.e. the portion of the LED emission within angle $\theta_E$, is utilized light. The portion of the LED emission which is not reflected by the reflecting surface 32, i.e. the portion of the LED emission outside the angle $\theta_E$, is unutilized light.

Figure 10:
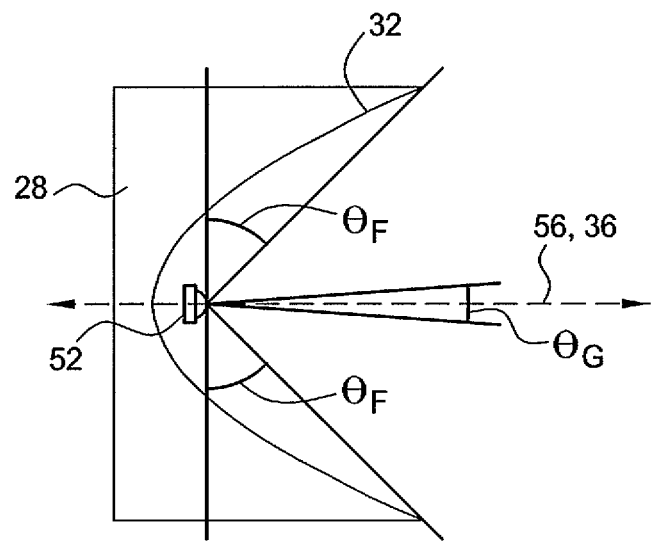
FIG. 10 depicts an embodiment of an alternative arrangement of the LED and reflecting surface.

FIG. 10 depicts an embodiment of an alternative relative positioning of the LED 52 and the reflecting surface 32. In this alternative arrangement, the central light-emitting axis 56 of the LED 52 is arranged to be parallel to the optical axis 36 of the reflecting surface 32.

Figure 11:
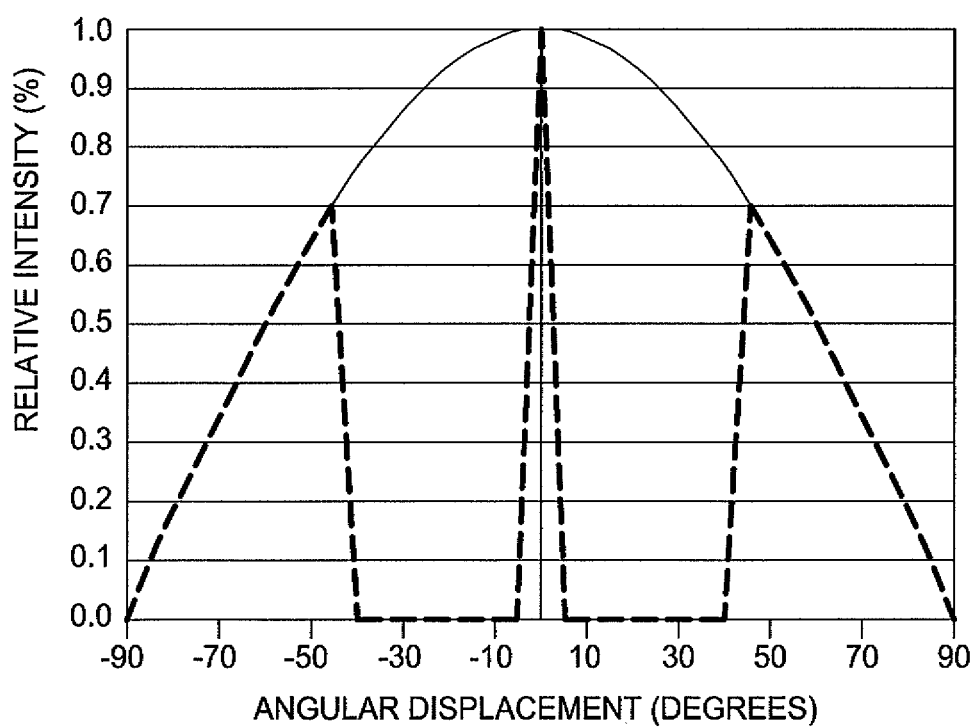
FIG. 11 is a graph depicting a representation of relative light intensity, versus angular displacement, for light typically emitted from the LED, and for light emitted from the embodiment of the alternative arrangement of the LED and reflecting surface depicted in FIG. 10.

FIG. 11 is a graph depicting a representation of the relative intensity of light, versus angular displacement in the plane of FIG. 10, for the typical light emission by the LED 52, and for light emitted by the alternative arrangement of the LED 52 and the reflecting surface 32 depicted in FIG. 10. The solid line of FIG. 11 represents the typical light intensity distribution emitted by the LED 52 without the presence of the reflecting surface 32. The dotted line of FIG. 11 represents the portion of the typical LED light intensity distribution which is utilized by the arrangement depicted in FIG. 10. The portion of light utilized comprises a first portion over an angle $\theta_G$, centered about the central light-emitting axis 56 and not reflected by the reflecting surface 32, and a second portion over an angle $\theta_F$ on either side of the central light-emitting axis 56, i.e., from 90° to 90°−$\theta_F$, and from −90° to −90°−$\theta_F$, wherein $\theta_F$ is about 45°. The first portion is utilized because if falls within the desired beam spread $\theta_D$ of the beacon light 20, and in one embodiment angle $\theta_G$ equals the beam spread $\theta_D$. The second portion is utilized because it is reflected by the reflecting surface 32 to also fall within the desired beam spread $\theta_D$ of the beacon light 20. An unutilized portion of the typical light intensity distribution which is over angles, relative to the central light emitting axis 56, from 0.5 $\theta_G$ to 90°−$\theta_F$, and from −0.5 $\theta_G$ to −90°+$\theta_F$, is not utilized because it is not reflected by the reflecting surface 32. The unutilized portion of the typical light intensity distribution emitted by the LED 52 from −0.5 $\theta_G$ to −90°+$\theta_F$ is undesirable and may be considered to be light pollution because it typically points downward towards the ground from, for example, a relatively high position.

Thus, FIG. 11 shows that the alternative relative positioning of the LED 52 and the reflecting surface 32 depicted in FIG. 10 does not utilize the majority of the high intensity central portion of the light intensity distribution typically emitted by the LED 52. By comparison, the embodiment of the LED reflector optic 24 of the present invention as depicted in FIG. 8 utilizes the majority of the high intensity central portion of the light intensity distribution typically emitted by the LED 52. A numerical comparison of the light utilizations depicted by FIGS. 9 and 11 shows that the area under the dotted line in FIG. 9 is about 45% greater than the area under the dotted line in FIG. 11. Thus, the embodiment of the LED reflector optic 24 depicted in FIG. 8 provides approximately a 45% increase in light utilization from a single LED 52, in comparison to the alternative arrangement depicted in FIG. 10.

Furthermore, the embodiment of the LED reflector optic 24 depicted in FIG. 8 provides the possibility of the reflector 28 having a reduced size relative to the embodiment of the alternative arrangement depicted in FIG. 10. For example, the reflector 28 depicted in FIG. 8 has a size which is reduced by about half in comparison to the embodiment of the reflector 28 depicted in FIG. 10.

The utilization of light by the embodiment of the LED reflector optic 24 depicted in FIG. 8 of the light emitted by the LED 52 provides an advantage of the present invention. However, the present invention nonetheless provides other advantages, and thus one embodiment of the LED reflector optic 24 comprises the LED 52 positioned such that the central light-emitting axis 56 is angled at the angle $\theta_A$ having a value of about 0°, as depicted in FIG. 10. In one embodiment, the about 0° has a tolerance of ±30°, i.e., from −30° to 30°. In another embodiment, the about 0° has a tolerance of ±10°, i.e., from −10° to 10°.

An exemplary illustration of another advantage provided by an aspect of the present invention is depicted in FIGS. 12-15. The projection of the cross-section 40 of the reflecting surface 32 along the linear extrusion axis 44 advantageously provides increased collimation of the reflected light.

Figure 12:
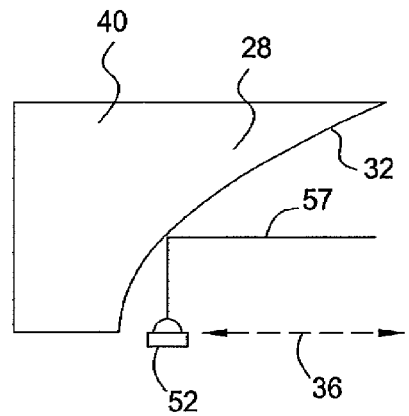
FIG. 12 depicts a partial side view of an embodiment of the LED reflector optic depicted in FIG. 2, showing mathematically simulated ray traces.

FIG. 12 depicts a partial side view of an embodiment of the LED reflector optic 24. In the embodiment of FIG. 12, the LED 52 is located at the focal distance of the reflecting surface 32 in a plane 47 (depicted in FIG. 16A). FIG. 12 also depicts mathematically simulated ray traces 57 showing the path of light traveling from the LED 52 to the reflecting surface 32 and outward from the reflector 28. Ray tracing is a technique that uses 3-D computer modeling and geometric optics to accurately determine the light path. FIG. 12 shows the ray traces 57 are parallel to the optical axis 36 in the depicted embodiment of the LED reflector optic 24.

Figure 13:
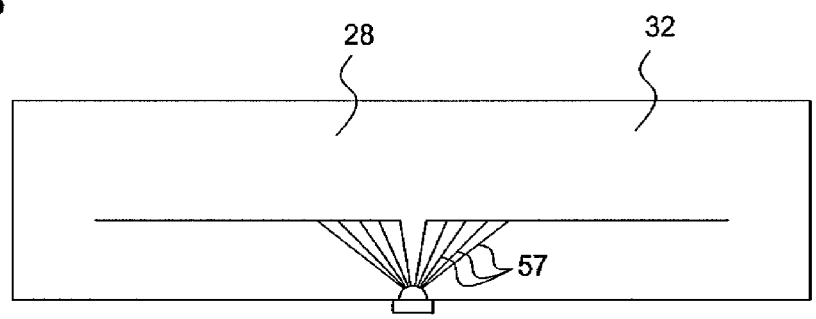
FIG. 13 depicts a partial front view of the embodiment of the LED reflector optic depicted in FIG. 12, showing the same ray traces shown in FIG. 12 from another view.

FIG. 13 depicts a partial frontal view of the embodiment of the LED reflector optic 24 depicted in FIG. 12, showing the same mathematically simulated ray traces 57 as FIG. 12, but from another view. Because the reflecting surface 32 of FIGS. 12 and 13 is a projection of the cross-section 40 along the linear extrusion axis 44, light traveling from the LED 52 to the reflecting surface results in well collimated light reflected parallel to the optical axis 36 of the reflecting surface 32.

Figure 14:
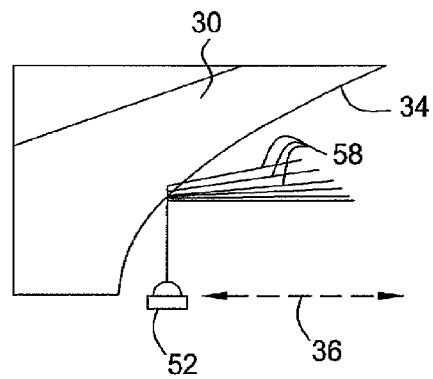
FIG. 14 depicts a partial side view of an embodiment of an alternative reflector having an alternative reflecting surface, showing mathematically simulated ray traces.
Figure 16B:
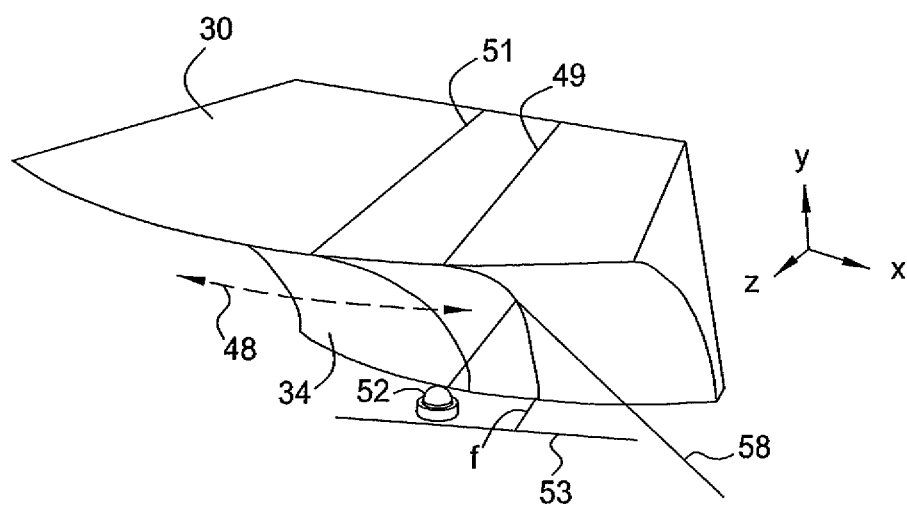
FIG. 16b depicts a partial perspective view of an embodiment the LED reflector optic having an embodiment of the alternative reflector comprising the alternative reflecting surface depicted in FIGS. 14 and 15.
Figure 17:
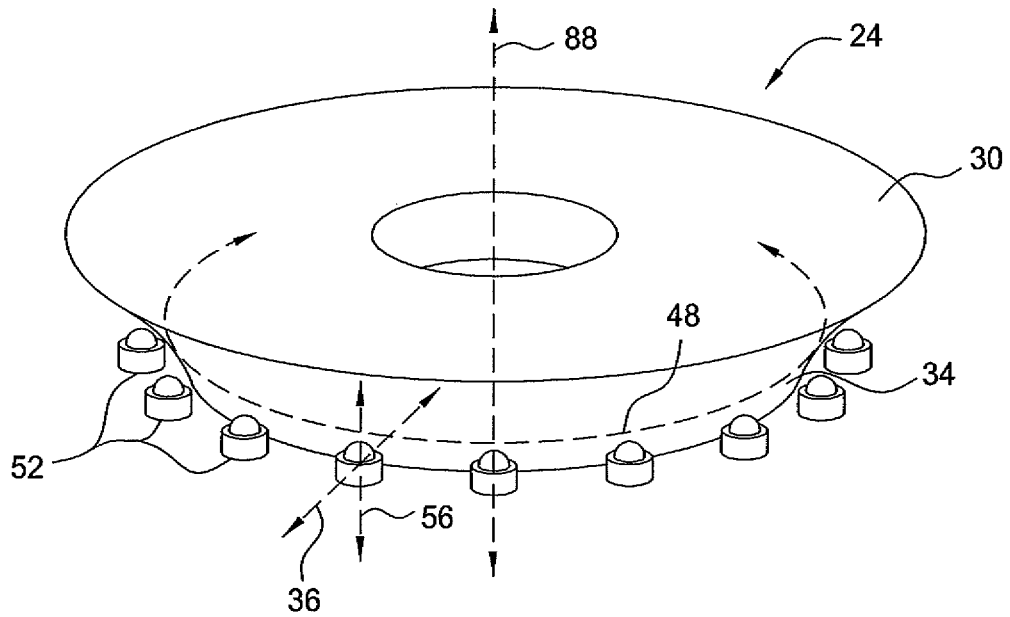
FIG. 17 depicts a perspective view of an embodiment of the LED reflector optic having an embodiment of the alternative reflector comprising the alternative reflecting surface.

By comparison, FIG. 14 depicts a partial side view of an embodiment of an alternative reflector 30 having an alternative reflecting surface 34 The alternative reflecting surface 34 has a cross-section that is projected along a curved trajectory 48 (as depicted in FIG. 17), not a linear axis. This curved trajectory is also known as a swept curvature. This alternative reflector 30 can be assembled with other reflectors. The resulting reflector can be continuous and form a circle or can be segmented depending on the radius of the curved trajectory and the number of reflector segments that are used. For example, the unsegmented reflector shown in FIG. 17 results when six reflector segments shown in FIG. 16B are assembled. Alternatively, a segmented reflector is formed when three of the reflector segments shown in FIG. 16B are assembled. The same result occurs if four or five of the reflector segments shown in FIG. 16B are assembled. Alternatively, the radius of the curved trajectory in FIG. 16B can be increased. A segmented reflector is then formed when six reflector segments shown in FIG. 16B, but with increased curved trajectory radii, are assembled.

In the embodiment of FIG. 14, the LED 52 is located at the focal distance of the alternative reflecting surface 34 in the plane 51 (depicted in FIG. 16B). FIG. 14 also depicts mathematically simulated ray traces 58 showing the path of light traveling from the LED 52, to the alternative reflecting surface 34 and outward from the alternative reflector 30.

Figure 15:
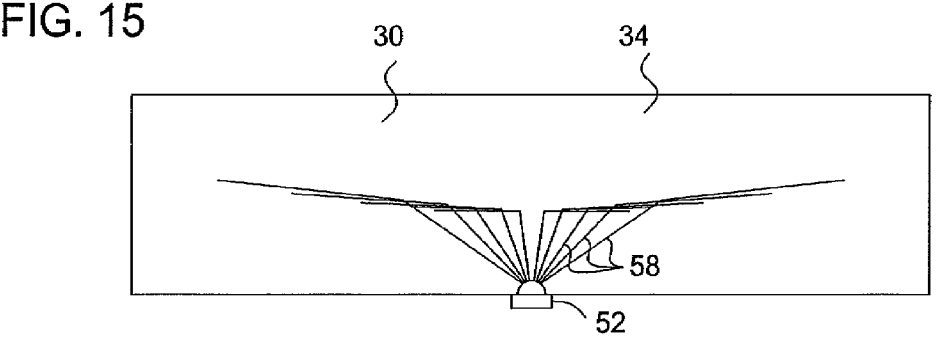
FIG. 15 depicts a partial front view of the embodiment of the alternative reflector having the alternative reflecting surface depicted in FIG. 14, showing the same ray traces shown in FIG. 14 from another view.

FIG. 15 depicts a partial front view of the embodiment of the alternative reflector 30 having the alternative reflecting surface 34 depicted in FIG. 14, and showing the same mathematically simulated ray traces 58 as FIG. 14, but from another view. FIGS. 14 and 15 shows that the light reflected by the alternative reflector 30 is not as well collimated as the light reflected by the reflector 28, as depicted in FIGS. 12 and 13. Light is reflected from the alternative reflecting surface 34 at angles vertically away from the optical axis 36.

Figure 16A:
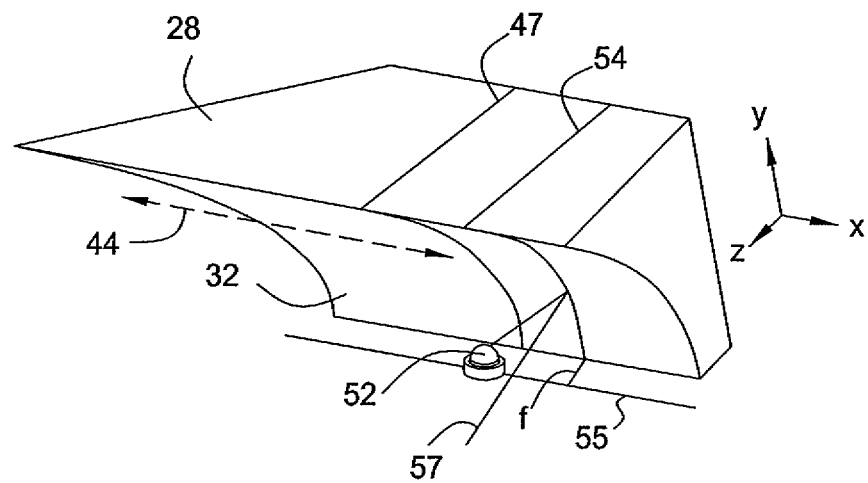
FIG. 16a depicts a perspective view of an embodiment of a segment, having the reflecting surface, of an embodiment of the LED reflector optic depicted in FIGS. 12 and 13.

FIG. 16A depicts a perspective view of an embodiment of a segment of the reflector 28 depicted in FIGS. 12 and 13, and FIG. 16B a partial perspective view of an embodiment of the alternative reflector 30 depicted in FIGS. 14 and 15. The increased collimation provided by the reflector 28, in comparison to the alternative reflector 30, can also be better understood in reference to FIGS. 16A and 16B. Generally speaking, a parabolic reflector, for example, receives light originating from its focal distance and reflects the light parallel to the optical axis of the reflector. If the reflector has the cross-section 40 projected along the linear extrusion axis 44, as in the embodiment of the reflector 28 depicted in FIG. 16A, then the parabolic system is lost only in the horizontal direction and is conserved in the vertical direction and the light will be collimated vertically. For example, considering light comprising vector components in the x, y and z directions depicted in FIG. 16A, line 55 demarks the focal length f for the vector component of light traveling in the y direction, and line 55 is common to the entire length of the reflector. Therefore the vector component of light emitted by LED 52 in the y direction strikes both plane 54 and plane 47 as arriving from the focal length.

By comparison, if the reflector is revolved, i.e. having the cross-section projected along the curved trajectory 48, as in the embodiment of the reflector 30 depicted in FIG. 16B, then the parabolic system is lost in both the horizontal and vertical directions. For example, FIG. 16B depicts a line 53 demarking the focal length f for the vector component of light traveling in the y direction, with respect to light arriving at plane 49, plane 49 being offset and angled horizontally from the plane 51. FIG. 16B shows that the LED 52 does not fall on the line 53 and thus does not emit a component of light in the y direction which strikes plane 49 as arriving from the focal length. Although, there may be at least one LED 52 that falls on line 53 (not shown), thus emitting a component of light in the y direction which strikes plane 49 as arriving from the focal length.

Thus, the embodiment of the reflector 28 having the projection of the cross-section 40 of the reflecting surface 32 along the linear extrusion axis 44 provides increased collimation of reflected light in comparison to the alternative reflector 30 having the alternative reflecting surface 34. However, the present invention nonetheless provides other advantages, and thus in one embodiment, as depicted in FIG. 17, the LED reflector optic 24 comprises the alternative reflector 30 having the alternative reflecting surface 34.

Figure 21:
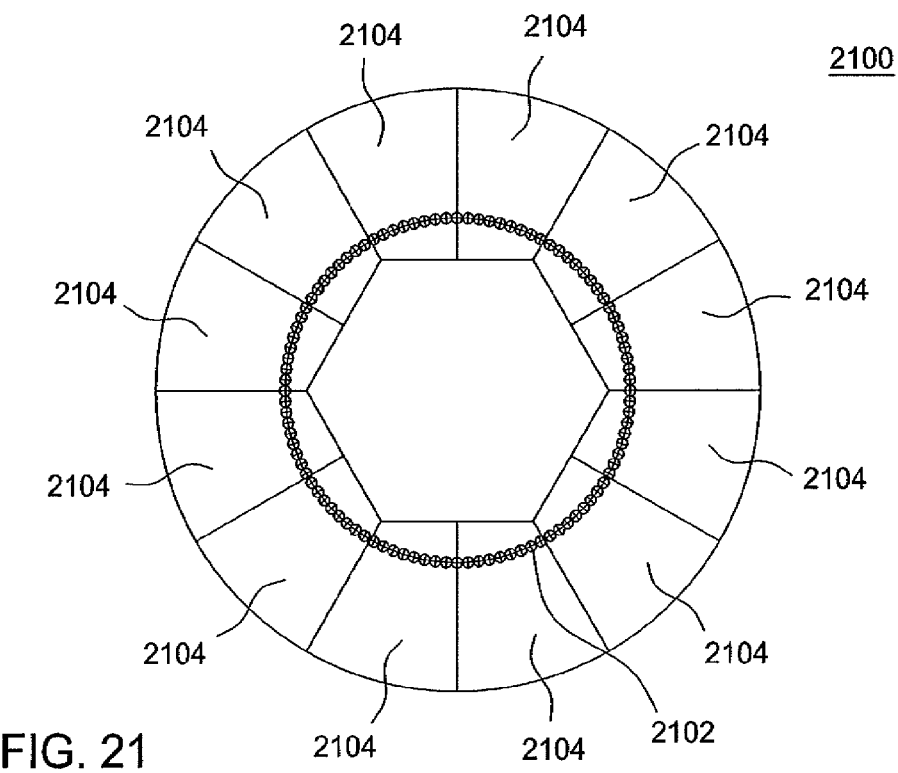
FIG. 21 depicts a revolved reflector.

One advantage of the circularly revolved reflector is that it may allow a higher number of LEDs to be used with the reflector. FIG. 21 shows that, in one example a reflector optic 2100 having a plurality of segmented reflectors 2104, 150 LEDs 2102 can be placed around the revolved reflector. The LEDs are placed a spacing of 4.1 mm. The radius at the focal point of the reflector is 100 mm. The radii at the inner and outer edges are 87.8 mm and 133 mm respectively.

Figure 22:
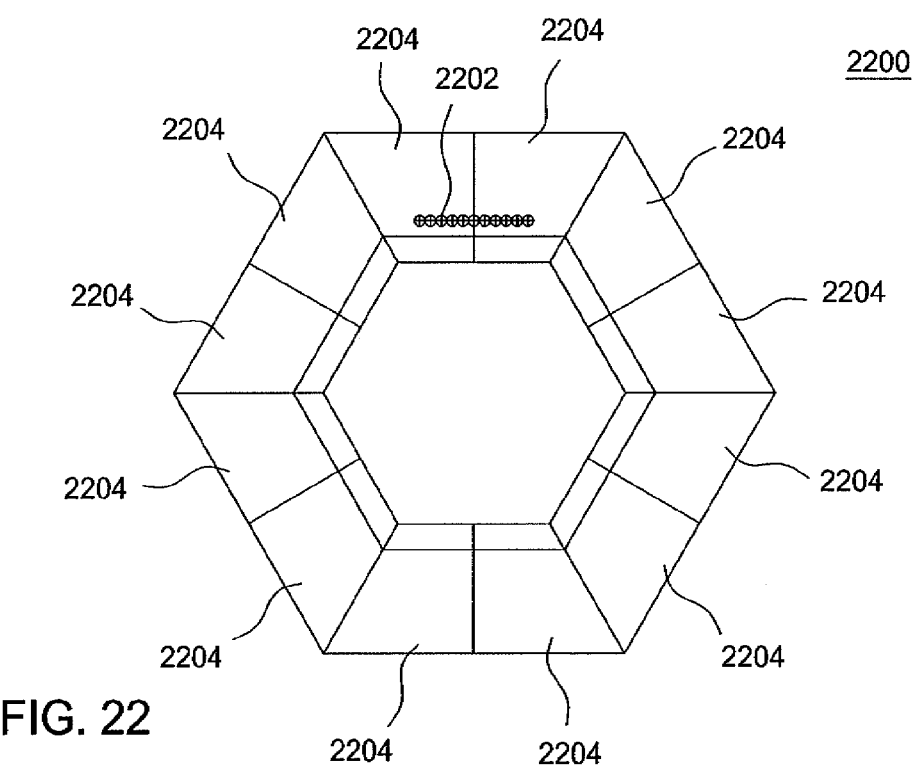
FIG. 22 depicts linear reflectors.

If linearly projected sections are used with a segmented reflector then some of the light from the LEDs near the intersection of the two reflectors is lost. Therefore, the LEDs should not be placed too close to the edges if high system efficiency is desired. FIG. 22 shows an embodiment of a reflector optic 2200 comprising a plurality of segmented reflectors 2204 having eighteen LEDs 2202 (not all LEDs shown) per reflector 2204 for a total of 108 LEDs 2202 when the LEDs 2202 are placed at a 4.1 mm spacing.

Figure 23:
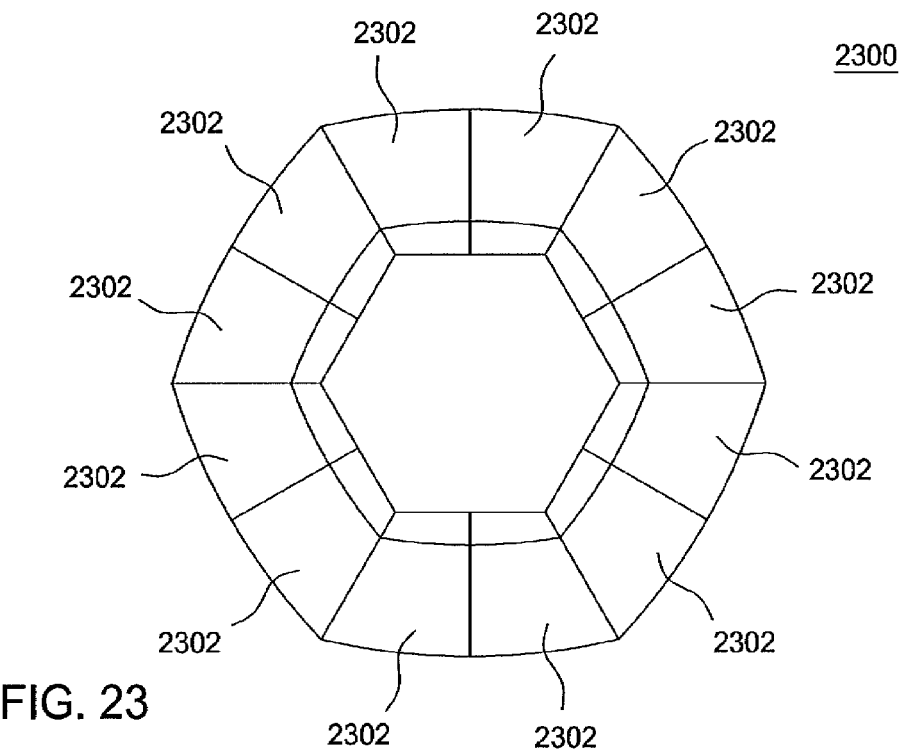
FIG. 23 depicts a segmented reflector with negative (convex) curvature.

In some applications an optimum configuration can be achieved by adding a limited degree of curved trajectory along the reflector cross section as shown in FIG. 23. The configuration shown of a reflector optic 2300 in FIG. 23 can be achieved by increasing the radius of the curved trajectory of the reflector shown in FIG. 16B and assembling six of the reflectors segments together. A plurality of reflector segments 2302 shown in FIG. 23 has a concave curved trajectory and each segment 2302 has a 100 mm radius of curvature. In one embodiment the curved trajectory follows a conic or substantially conic shape.

Figure 24:
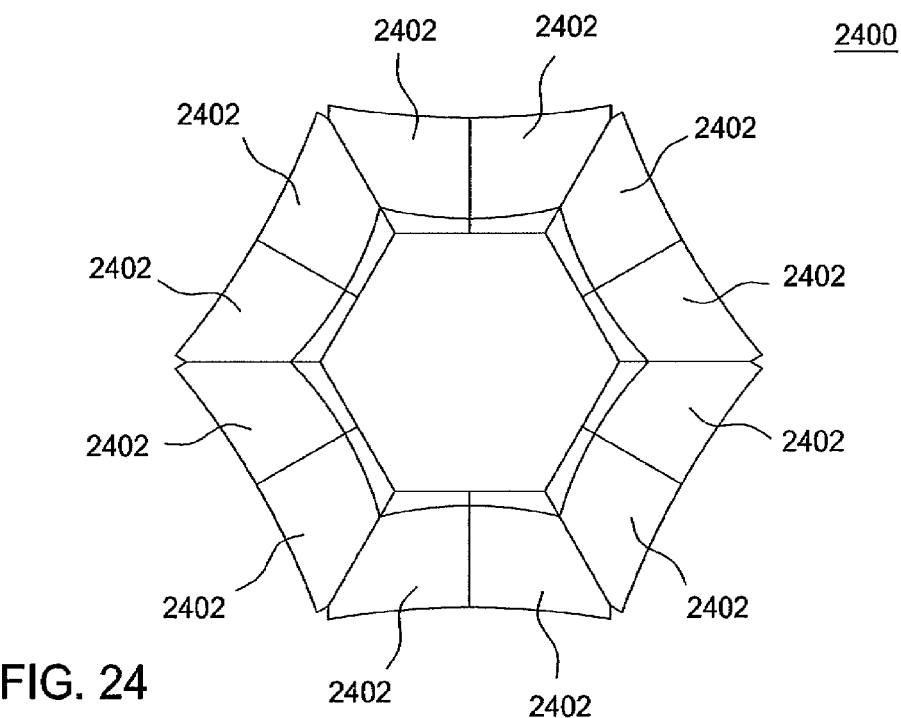
FIG. 24 depicts a segmented reflector with positive (concave) curvature.

The curved trajectory can be concave, as shown in FIG. 23, or can be convex, as shown in FIG. 24. FIG. 24 illustrates a reflector optic 2400 having a plurality of reflector segments 2402.

The reflector segments 2302 shown in FIG. 23 have a convex curved trajectory and each segment has a 100 mm radius of curvature. The radius of the curved trajectory should be large in order to limit the vertical beam divergence. In one embodiment, the inner or outer radius of the concave or convex curved trajectory is greater than two times a distance to the center of the light fixture. In another embodiment, the inner or outer radius of the concave or convex curved trajectory is greater than two times a distance to the center area of the LEDs. Combinations of concave and convex curved trajectories can be used. The concave and convex curved trajectories can form a smooth wavy trajectory or can have sharp transitions. The sharp transitions are illustrated in FIG. 23 and FIG. 24. In the case of combinations of concave and convex trajectories, the average inner or outer curvature of the concave or convex curved trajectory is greater than two times a distance to the center of the light fixture or LEDs. In another embodiment, the average inner or outer curvature of the concave or convex curved trajectory is greater than two times the distance to the center area of the LEDs.

Figure 25:
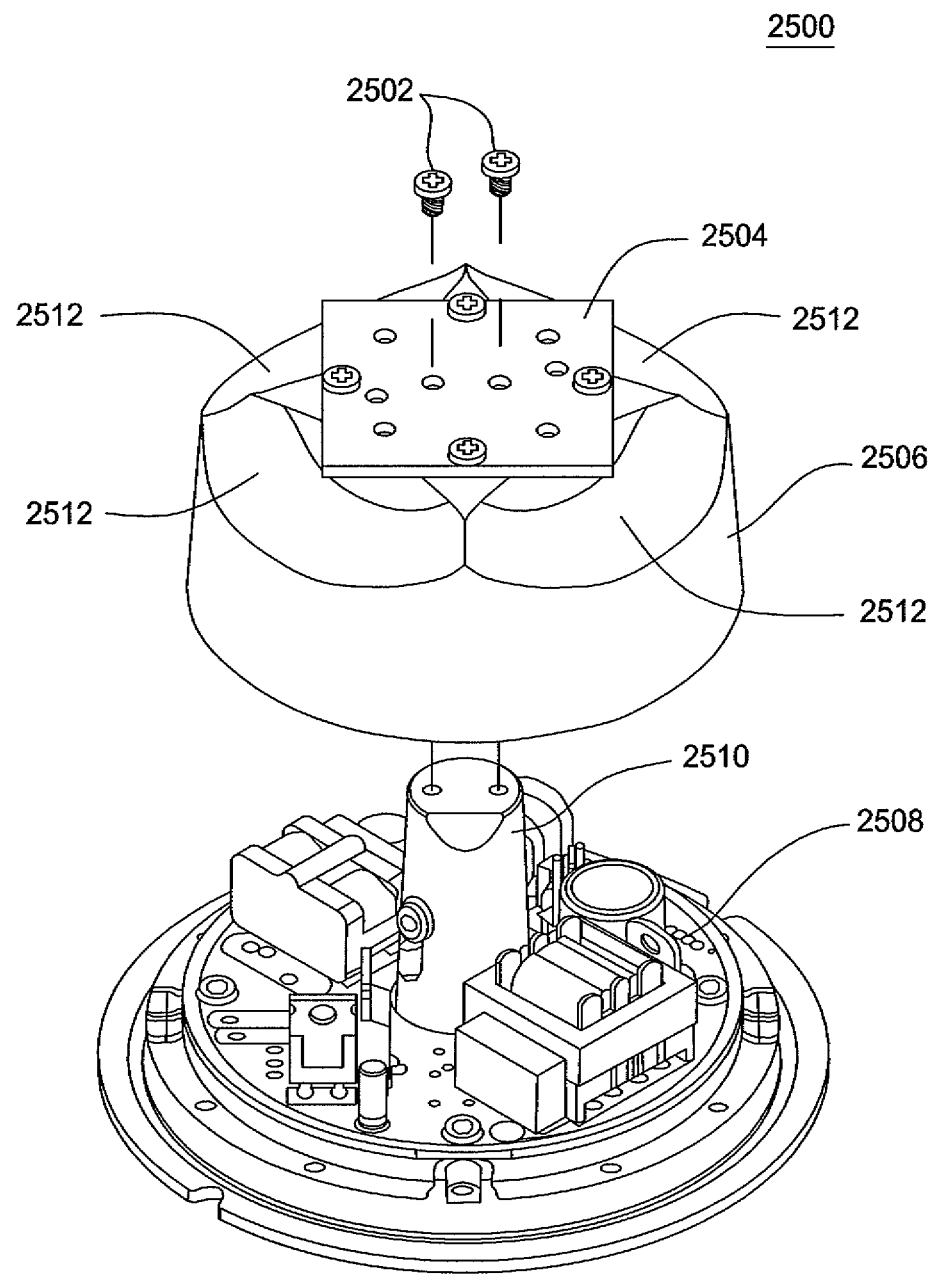
FIG. 25 depicts an exploded view of a beacon light using the segmented reflector with positive curvature.

FIG. 25 shows a beacon light 2500 that utilizes the light-emitting diode (LED) reflector optic 2506 with curved trajectory along the reflector cross sections 2512. In this application the reflector is mounted upside-down.

As illustrated in FIG. 25, a reflector optic 2506 having a plurality of curved reflector segments 2512 may then be placed over a power supply assembly 2508. The plurality of curved reflector segments 2512 may be concave, convex or a combination thereof, as described above. In addition, the relationship between the radius of curvature and a distance between a reflector segment 2512 to a respective LED, as discussed above. A LED circuit board 2504 may be coupled to or mounted on top of a stalk 2510. The reflector optic 2506 may be coupled to the stalk 2510 via one or more screws 2502.

The LED reflector optics and the various embodiments of a beacon light described within the present invention provide a more efficient optical system. This more efficient optical system results in smaller and lighter devices with lower energy consumption and less light pollution. The more efficient optical system also enables greater use of solar power to power the LED reflector optic and the beacon light.

Referring back to the reflector optic 24 and the beacon light 20 illustrated in FIG. 2, the reflecting surface 32 may comprise at least one of: a metal or a reflective material. For example, in one embodiment the reflecting surface 32 comprises a reflectorized surface such as, for example, a surface comprising a layered polymer which reflects light.

Figure 18:
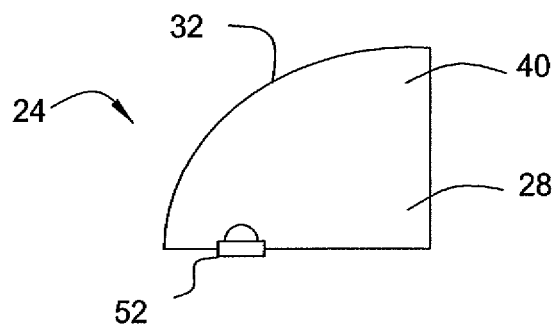
FIG. 18 depicts a partial sectional view of an embodiment of the LED reflector optic comprising at least one of: a glass, a plastic or a transparent material.

In another embodiment, depicted in FIG. 18, the reflector 28 comprises at least one of: glass, plastic or a transparent material. In the embodiment depicted in FIG. 18, the reflector 28 reflects light using total internal reflection.

The intensity distribution of light emitted from the LED reflector optic 24 can be adjusted by modifying the specific shape of the reflecting surface 32. In one embodiment, the shape of the cross-section 40 of the reflecting surface 32 is defined by the following equation:

$$z = \frac{cy^2}{1 + \sqrt{1 - (1+k)c^2 y^2}} + F(y), \tag{1}$$

where z is a coordinate along an axis parallel to the optical axis 36, y is a coordinate on an axis perpendicular to both the optical axis and the extrusion axis, k is a conic constant, c is a curvature, and F(y) is a variable function. FIG. 16A depicts the relationship of the z and y coordinates, as well as an x coordinate along an axis parallel to the extrusion axis 44, with respect to the reflecting surface 32.

In one embodiment, F(y) is equal to zero, and equation (1) provides a conic cross-section. For example, (k<−1) provides a hyperbola, (k=−1) provides a parabola, (−1<k<0) provides an ellipse, (k=0) provides a sphere, and (k>0) provides an oblate sphere, which are all forms of conics. Modifying k and c modifies the shape of the reflecting surface 32, and thus also modifies the shape of the light intensity distribution reflected by the reflecting surface 32. The reflected beam may thereby be made more narrow or broad as desired.

In one embodiment, F(y) is not equal to zero, and equation (1) provides a cross-sectional shape which is modified relative to a conic shape by an additional mathematical term or terms. For example, F(y) can be chosen to modify a conic shape to alter the reflected light intensity distribution in some desirable manner. Also, in one embodiment, F(y) can be used to provide a cross-sectional shape which approximates other shapes, or accommodates a tolerance factor in regards to a conic shape. For example, F(y) may be set to provide cross-sectional shape having a predetermined tolerance relative to a conic cross-section. In one embodiment, F(y) is set to provide values of z which are within 10% of the values provided by the same equation but with F(y) equal to zero.

In one embodiment, the specific cross-sectional conic shape of the reflecting surface 32 or the alternative reflecting surface 34 is defined by the following set of equations:

$$z = \frac{cr^2}{1 + \sqrt{1 - (1+k)c^2 r^2}}, \text{ and} \tag{2}$$

$$r^2 = x^2 + y^2; \tag{3}$$

where x, y, z, c and k are defined as above in regards to equation (1). FIG. 16B depicts the relationship of the x, y and z coordinates with respect to the alternative reflecting surface 34.

In another embodiment, the cross-sectional shape of the alternative reflecting surface 34 has a shape which comprises the basic conic shape modified by using additional mathematical terms. For example, in one embodiment, the cross-sectional shape of the reflecting surface 32 or the alternative reflecting surface 34 comprises a polynomial asphere defined by the following set of equations:

$$z = \frac{cr^2}{1 + \sqrt{1 - (1+k)c^2 r^2}} + \sum_{n=2}^{10} C_{2n} r^{2n} \quad (4)$$

$$r^2 = x^2 + y^2; \quad (5)$$

wherein x, y, z, k and c are as defined above, and C is a constant.

In another embodiment, the shape of the cross-section 40 of the reflecting surface 32 or the alternative reflecting surface 34 is defined by fitting a curve, such as a spline fit, to a set of points. In one embodiment, the spline fit is used to approximate the conic or substantially conic cross-sectional shape of one embodiment of the cross-section 40. In one embodiment, the cross-section 40 of the reflecting surface 32 can be approximately matched using equation 1, 2 or 4.

In another embodiment, as depicted in FIG. 19, the reflector comprises a reflecting surface which is a faceted surface 32a which has a shape which approximates a conic shape. The faceted surface 32a comprises a plurality of individual planar facets 92. Collectively, the plurality of individual planar facets 92 approximate a conic shape, with the approximation becoming more accurate as the individual planar facets 92 are made smaller.

Figure 20:
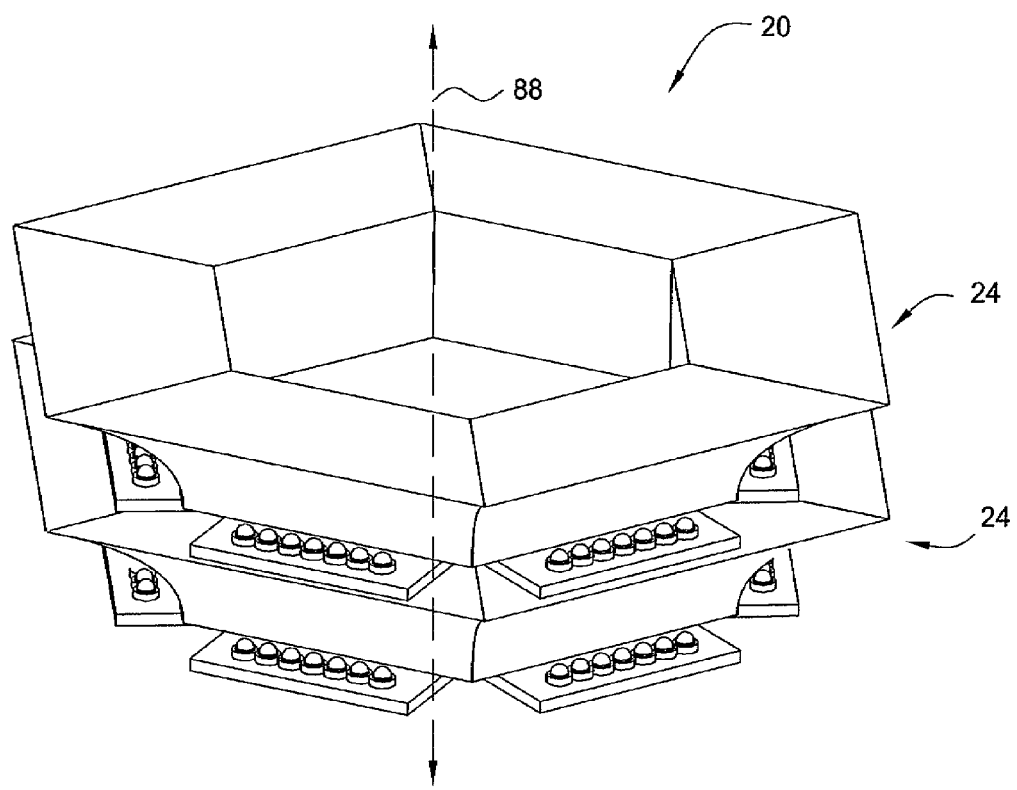
FIG. 20 depicts a partial perspective view of an embodiment of the beacon light having a plurality of the LED reflector optics.

In one embodiment, the beacon light 20 comprises a plurality of LED reflector optics. For example, FIG. 20 depicts a partial perspective view of an embodiment of the beacon light 20 which comprises a plurality of LED reflector optics 24 stacked on top of each other.

Figure 26:
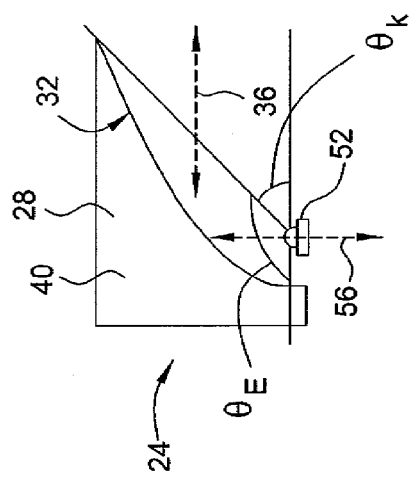
FIG. 26 depicts a partial sectional side view of an embodiment of the LED reflector optic depicted in FIG. 2 illustrating how some light escapes.

FIG. 26 shows a cross section of the reflector optic similar to FIG. 8. As can be seen in FIG. 26, there is a portion of light ($\theta_k$) that escapes without being reflected by the segmented reflector 28. In one embodiment, $\theta_k$ is light that is emitted by the LED 52 at approximately +50° to +80° relative to the central light emitting axis 56 of the LED 52. This non-reflected portion of light ($\theta_k$) is not collimated and therefore may not be useful in certain applications. This may even be considered glare light in certain applications such as vehicle forward lighting as it may be directed toward oncoming traffic.

Figure 27:
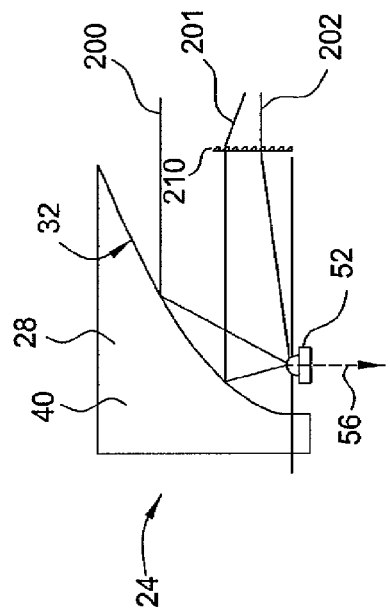
FIG. 27 depicts a partial sectional side view of an embodiment of the LED reflector optic depicted in FIG. 2 using a lens to collimate light.

As shown in FIG. 27, a lens 210 may be used to collimate light that is not emitted toward the segmented reflector 28. FIG. 27 shows how a ray 202 that would not have been collimated by the segmented reflector 28 can be collimated by the lens 210. In one embodiment, the lens 210 may be a Fresnel lens as illustrated by example in FIG. 27. However, it should be noted that the lens 210 may be a thick lens or any other type of lens.

FIG. 27 shows a drawback of this approach in that by using the lens 210 alone, the lens 210 may redirect and de-collimate the light 201 that would have been collimated by the reflecting surface 32. In addition, some light 200 may miss the lens 210. In other words, the lens 210 may refract the light ray 201 downward and make it useless or even a troublesome in certain applications such as vehicle forward lighting. Moving the lens 210 closer to the LED 52 and reducing the height of the lens 210 may reduce the amount of light that both reflects off of the reflecting surface 32 and then refracts through the lens 210; however, this will increase the lens divergence and lessen the collimation.

Referring back to FIG. 1, a portion of the light (e.g. light emitted at an angle $\theta_k$) can be collimated by using a reflector 212. In one embodiment, the reflector 212 may be a planar or flat surfaced reflector or a substantially planar or approximately flat surfaced reflector. The reflector 212 may be fabricated from any material that reflects light, e.g., a metalized plastic.

The reflector 212 is positioned remotely from the reflector 28 and the reflecting surface 32. That is, the reflector 212 is not connected to the reflector 28 or the reflecting surface 32. In another embodiment, the reflector 212 may be connected or physically attached to the reflector 28 or the reflecting surface 32. The reflector 212 may be positioned parallel, or approximately parallel, to the optical axis 36 so that the reflector 212 reflects light more downward as shown in FIG. 1. Positioning the reflector 212 approximately parallel to the optical axis 36 allows almost all of the collimated light from the reflecting surface 32 to pass without being blocked significantly. In one embodiment, the size of the reflector 212 and/or the positioning of the reflector 212 may be such that substantially all of the light emitted at an angle $\theta_k$ will be reflected.

In other words, the reflector 212 may be positioned such that it reflects only light that is emitted from the LED 52 that would not reflect off of the reflecting surface 32. For example, FIG. 1 shows that light rays 203 and 204 can be redirected by the reflector 212 more downward. Notably, light rays 203 and 204 are emitted from the LED 52 at an angle that would not have reflected off of the reflecting surface 32. In one embodiment, the reflector 212 reflects light to an angle greater than 100° with respect to the central light-emitting axis 56 of the LED 52.

This arrangement may be useful in applications where light in a more downward direction may be desired. This arrangement may be useful for applications such as automotive forward lighting.

Figure 28:
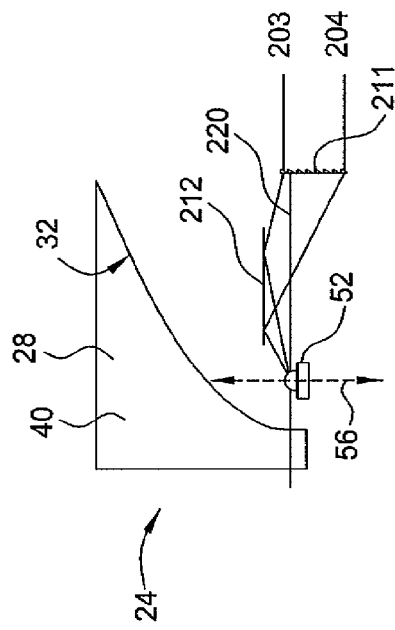
FIG. 28 depicts a partial sectional side view of an embodiment of the LED reflector optic depicted in FIG. 2 using a second reflector and a lens.

In another embodiment, the reflector 212 may be used in combination with a lens 211. A portion of light (e.g. light emitted at an angle $\theta_k$) can be collimated by using a reflector 212 and a lens 211 in combination if the lens 211 is positioned lower than the position illustrated in FIG. 27, and a reflector 212 is used, as shown in FIG. 28. It should be noted that the lens 211 and the reflector 212 may be separate components or they may be combined into a single component. In one embodiment, the reflector 212 may be a planar or flat surfaced reflector or a substantially planar or approximately flat surfaced reflector. In one embodiment, the reflector 212 comprises a substantially planar surface along an axis substantially perpendicular to the central light-emitting axis of the LED 52. In one embodiment, the perpendicularity has a tolerance of +/−10°. The reflector 212 may be fabricated from any material that reflects light, e.g., a metalized plastic.

The reflector 212 is positioned remotely from the reflector 28 and the reflecting surface 32. That is, the reflector 212 is not connected to the reflector 28 or the reflecting surface 32. In another embodiment, the reflector 212 may be connected or physically attached to the reflector 28 or the reflecting surface 32. The reflector 212 may be positioned parallel, or approximately parallel, to the optical axis 36 so that the reflector 212 reflects light more downward as shown in FIG. 28. In one embodiment, the parallelism has a tolerance of +/−10°. Positioning the reflector 212 approximately parallel to the optical axis 36 allows almost all of the collimated light from the reflecting surface 32 to pass without being blocked significantly. In one embodiment, the size of the reflector 212 and/or the positioning of the reflector 212 may be such that substantially all of the light emitted at an angle $\theta_k$ will be reflected.

In other words, the reflector 212 may be positioned such that it reflects only light that is emitted from the LED 52 that would not reflect off of the reflecting surface 32. For example, FIG. 28 shows that light rays 203 and 204 can be redirected by the reflector 212 more downward toward the lens 211. Notably, light rays 203 and 204 are emitted from the LED 52 at an angle that would not have reflected off of the reflecting surface 32.

Figure 29:
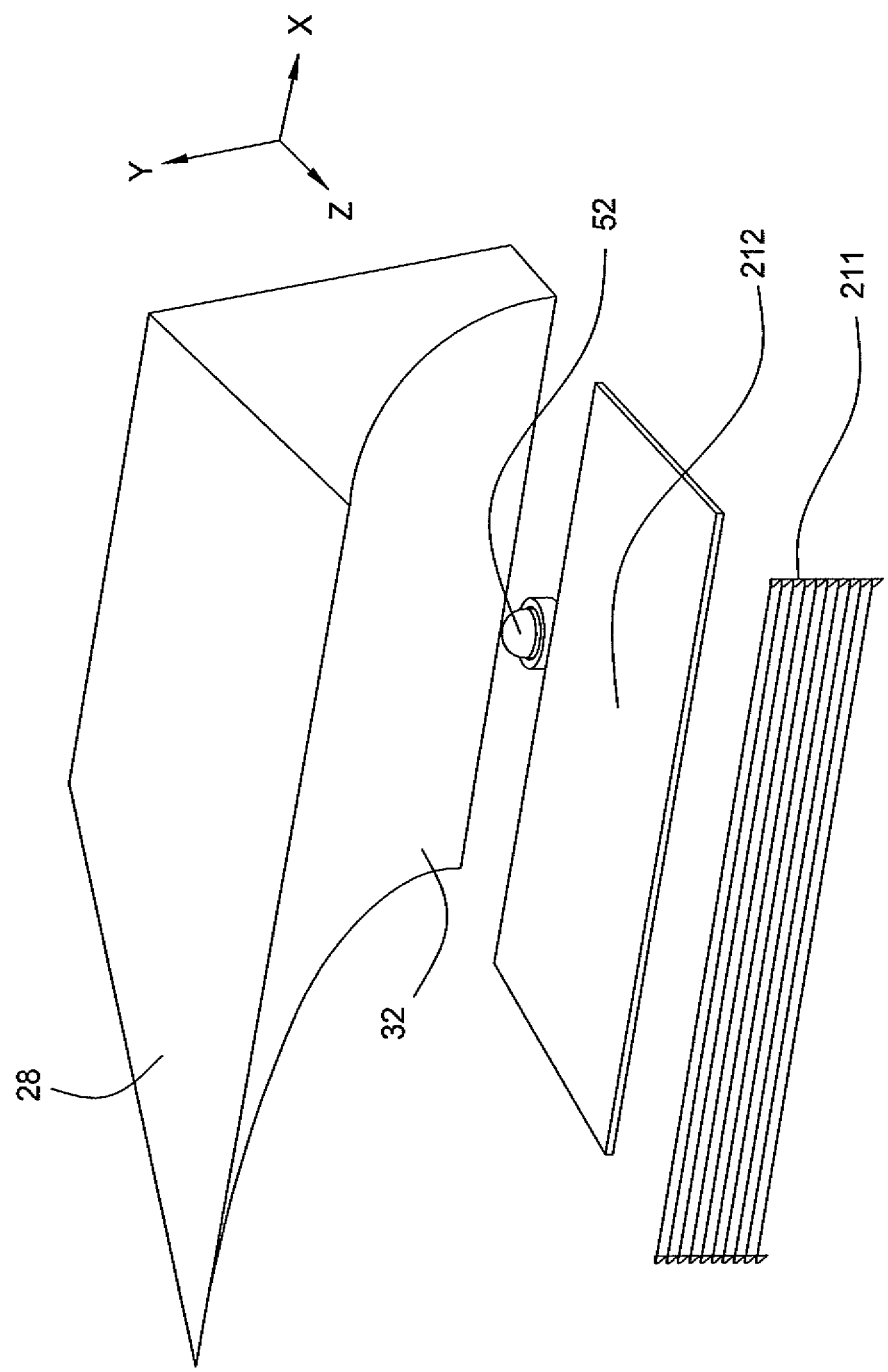
FIG. 29 depicts an isometric exploded view of a partial sectional side view of an embodiment of the LED reflector optic depicted in FIG. 28.

In one embodiment, the lens 211 is positioned relative to the LED 52 and the reflector 212 such that the lens 211 collimates the light emitted by the LED 52 and reflected off of the reflector 212. The lens 211 may be located mainly below the path of the light that is collimated by the reflecting surface 32. FIG. 29 illustrates an isometric exploded view of the reflector and lens optic combination illustrated in FIG. 28. In a further embodiment, a lens may be used but the lens may not serve to collimate the light significantly.

Common LEDs emit light generally in a hemispherical pattern with the peak intensity approximately directly forward. A plane can be drawn that is located at the mounting position of the LED and that is perpendicular to the central light-emitting axis 56. This plane may be referred to as an LED plane 220. In one embodiment, the lens 211 is located mostly below the LED plane 220 as shown in FIG. 28. In one embodiment, the reflector 212 is located mostly above the LED plane 220 as shown in FIG. 28.

Figure 30:
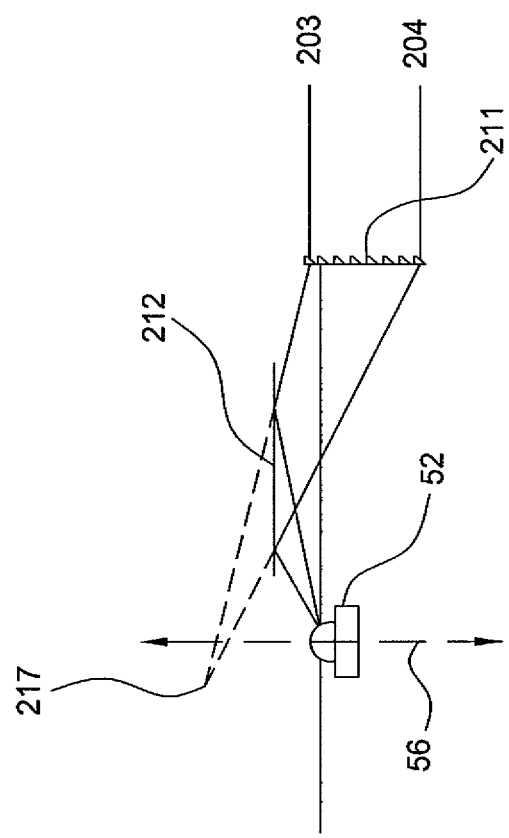
FIG. 30 illustrates one embodiment of a main lens focal position.

FIG. 30 illustrates one embodiment of a main lens focal position 217 of the lens 211 that is located above the plane 220. FIG. 30 illustrates one embodiment of the main lens focal position 217 with respect to the LED 52. In one embodiment, the main lens focal position 217 of the lens 211 is located at least 10 mm above the LED plane 220. In other words, the location of the main lens focal position 217 is at least 10 mm further along the y axis, as shown in FIG. 29, than the LED 52. In one embodiment, the main lens focal position 217 of the lens 211 is located at about the same horizontal position as the LED 52. In other words, the location of the main lens focal position 217 is at least 10 mm further along the z axis, as shown in FIG. 29, than the LED 52. In one embodiment, the main lens focal position 217 of the lens 211 is located at about the same position as the LED 52 in the x axis, as shown in FIG. 29, within a tolerance of +/−10 mm.

The curvature of the lens 212 may be a linearly projected cross-section or a cross section projected along a curve. The focal position for a reflector 28 or a lens 211 may be a point or it may be a line as in the case of projected cross sections. An example focal line 55 is shown in FIG. 16A for a projected cross section 40, as illustrated in FIG. 12, for reflector 28. The reflecting surface 32 may be projected along a line or projected along a curve.

Figure 31:
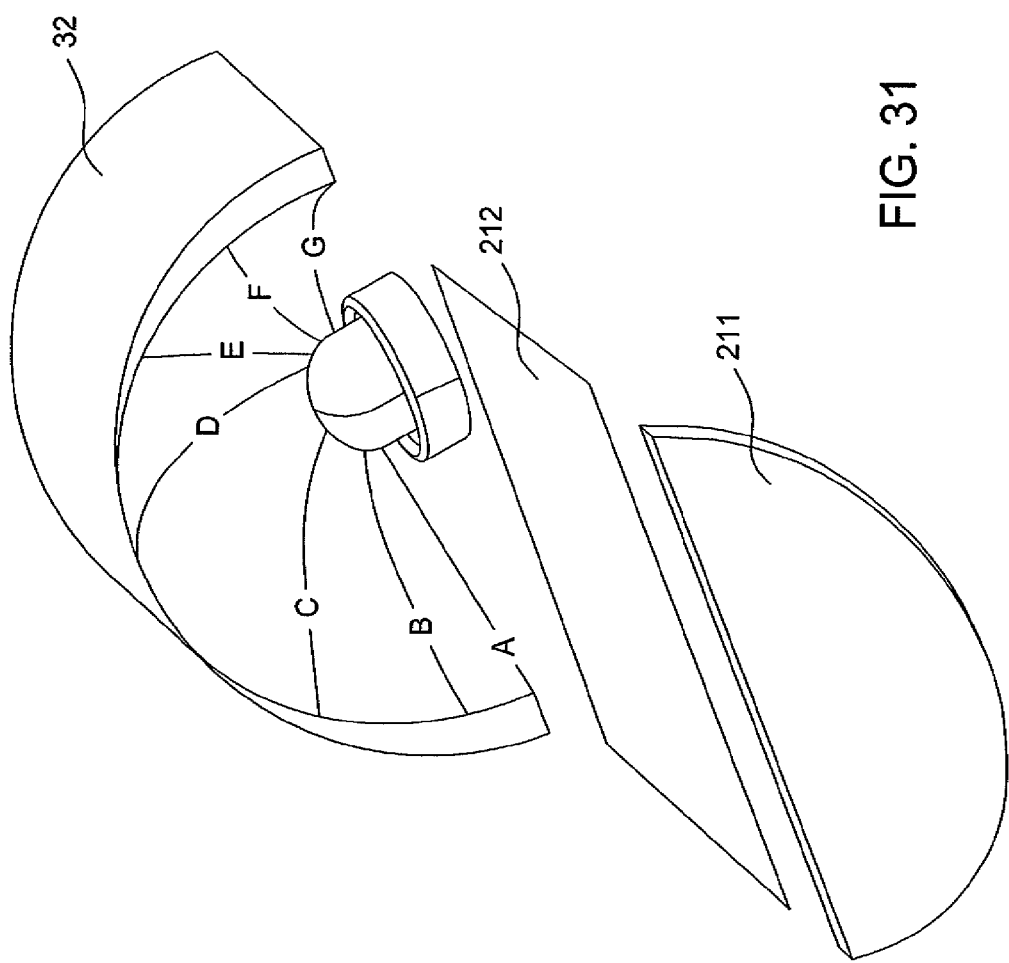
FIG. 31 depicts one embodiment of an LED reflector optic having a second reflector revolved around an LED.

In one embodiment, a cross section of the reflecting surface 32 may also be revolved to form a curved reflector, e.g. a semi-circular reflector. Reflector cross sections A through G may be blended to form a blended cross surface, as shown in FIG. 31. In another embodiment, two or more cross sections may be blended to form a blended cross surface. The reflector 212 may be substantially planar. That is, the reflector 212 may have a substantially planar surface along an axis parallel to the optical axis 36 and have a substantially planar surface along an axis perpendicular to the optical axis 36.

In another embodiment of the reflecting surface 32, as shown in FIG. 32, the reflector 212 may be planar in one axis and revolved in a second axis. The reflector 212 may have a substantially planar surface along an axis parallel to the optical axis 36 and a curved surface along an axis perpendicular to the optical axis 36.

The lens 211 and the reflecting surface 32 may collimate the light along approximately the same optical axis 36. In one embodiment, the lens 211 and the reflecting surface 32 both collimate light along axes that are parallel to within 10°. In one embodiment the optical axis of the lens 211, the optical axis 36 of the reflecting surface 32, and the reflector 212 are all parallel to within 10°.

In one embodiment, at least 60% of the LED light at some reflector cross section that is emitted between −90° and +50° is reflected to angles between −5° and +5° with respect to the central light-emitting axis 56. The light emitted between −90° and +50° may be represented by $\theta_E$ in FIG. 26.

In one embodiment, at least some of the LED light at some reflector cross section emitted between +50° and +80° is reflected to angles between +100° and +130° with respect to the central light-emitting axis 56. The light emitted between +50° and +80° may be represented by $\theta_K$ in FIG. 26.

In one embodiment, at least 50% of the LED light at some reflector cross section that is emitted between +50° and +80° is first reflected by a substantially planar reflector (e.g., the reflector 212) and then refracted by a lens (e.g., the lens 211) to angles between −5° and +5° with respect to the central light-emitting axis 56.

A method of providing an LED optic is disclosed. In one embodiment, the method comprises positioning at least one first reflector above an LED plane of at least one LED, wherein the first reflector comprises a curved-cross section and the at least one LED is positioned approximately 90 degrees with respect to an optical axis of the first reflector, positioning at least one second reflector above the LED plane, positioning at least one lens below the LED plane and transmitting light from the at least one LED onto the at least one first reflector and the at least one second reflector, wherein the at least one lens collimates light reflected by the at least one second reflector. In one embodiment, the lens is a Fresnel lens.

The present invention has been generally described within the context of the LED reflector optic and the beacon light. However, it will be appreciated by those skilled in the art that while the invention has specific utility within the context of the LED reflector optic and the beacon light, the invention has broad applicability to any light system.

While the foregoing is directed to embodiments of the present invention, other and further embodiments of the invention may be devised without departing from the basic scope thereof, and the scope thereof is determined by the claims that follow. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

The invention claimed is:

1. A light-emitting diode (LED) optic, comprising:
    at least one LED comprising an LED plane, wherein the LED plane comprises a plane located at a mounting position of the at least one LED and is perpendicular to a central light emitting axis of the at least one LED;
    a first reflector positioned above the LED plane and comprising a parabolic cross-section, wherein the first reflector collimates light emitted by the at least one LED that is reflected by the first reflector parallel to an optical axis of the first reflector, wherein the central light-emitting axis of the at least one LED is positioned approximately 90 degrees with respect to the optical axis of the first reflector; and
    at least one second reflector positioned above the LED plane and the at least one LED, wherein the at least one second reflector comprises a substantially planar surface along an axis substantially parallel to the optical axis of the first reflector and the LED plane, wherein the at least one second reflector is positioned to reflect light that is emitted from the at least one LED in a downward direction that would not reflect off of the first reflector.

2. The LED optic of claim 1, wherein the at least one second reflector comprises a substantially planar surface along an axis substantially perpendicular to the central light-emitting axis of the at least one LED.

3. The LED optic of claim 1, wherein the at least one second reflector reflects light to an angle greater than 100° with respect to the central light-emitting axis of the at least one LED.

4. The LED optic of claim 1, further comprising:
at least one lens positioned below the LED plane.

5. The LED optic of claim 4, wherein a light emitted from the at least one LED reflects off of the at least one second reflector and then passes through the at least one lens.

6. The LED optic of claim 4, wherein the at least one lens collimates light emitted from the at least one LED and reflected off of the at least one second reflector.

7. The LED optic of claim 4, wherein the at least one lens comprises a Fresnel lens.

8. The LED optic of claim 4, wherein, at a reflector cross section, at least 50% of light emitted from the at least one LED that is emitted between +50° and +80° is reflected by the second reflector to angles between +100° and +130° with respect to the central light-emitting axis of the at least one LED.

9. The LED optic of claim 8, wherein at least 50% of the light emitted from the at least one LED at the reflector cross section that is emitted between +50° and +80° is first reflected by the at least one second reflector and then refracted by the at least one lens.

10. The LED optic of claim 1, wherein, at a reflector cross section, at least 60% of light emitted from the at least one LED that is emitted between −90° and +50° is reflected by the first reflector to angles between −5° and +5° with respect to an optical axis.

11. An optic, comprising:
at least one light emitting means comprising a light emitting means plane, wherein the light emitting means plane comprises a plane located at a mounting position of the at least one light emitting means and is perpendicular to a central light emitting axis of the at least one light emitting means;
a first reflecting means positioned above the light emitting means plane and comprising a parabolic cross-section, wherein the first reflecting means collimates light emitted by the at least one light emitting means that is reflected by the first reflecting means parallel to an optical axis of the first reflecting means, wherein the central light-emitting axis of the at least one light emitting means is positioned approximately 90 degrees with respect to the optical axis of the first reflecting means; and
at least one second reflecting means positioned above the light emitting means plane and the at least one light emitting means, wherein the at least one second reflecting means comprises a substantially planar surface along an axis substantially parallel to the optical axis of the first reflector and the light emitting means plane, wherein the at least one second reflecting means is positioned to reflect light that is emitted from the at least one light emitting means in a downward direction that would not reflect off of the first reflecting means.

12. The optic of claim 11, wherein the at least one second reflecting means comprises a substantially planar surface along an axis substantially perpendicular to the central light-emitting axis of the at least one light emitting means.

13. The optic of claim 11, wherein the at least one second reflecting means reflects light to an angle greater than 100° with respect to the central light-emitting axis of the at least one light emitting means.

14. The optic of claim 11, further comprising:
at least one collimating means positioned below the light emitting means plane.

15. The optic of claim 14, wherein a light emitted from the at least one light emitting means reflects off of the at least one second reflecting means and then passes through the at least one collimating means.

16. The optic of claim 14, wherein the at least one collimating means collimates light emitted from the at least one light emitting means and reflected off of the at least one second reflecting means.

17. The optic of claim 14, wherein the at least one collimating means comprises a Fresnel lens.

18. The optic of claim 14, wherein the at least one collimating means is positioned below a path of light that is collimated by the plurality of reflecting means.

19. The optic of claim 14, wherein at least 60% of light emitted from the at least one light emitting means at a reflector cross section that is emitted between −90° and +50° is reflected by the first reflecting means to angles between −5° and +5° with respect to an optical axis.

20. The optic of claim 11, wherein at least 50% of the light emitted from the at least one light emitting means at the reflector cross section that is emitted between +50° and +80° is first reflected by the at least one second reflecting means and then refracted by the at least one collimating means.

21. A method, comprising:
positioning at least one first reflector above a light-emitting diode (LED) plane of at least one LED, wherein the at least one first reflector comprises a parabolic-cross section and the at least one LED is positioned approximately 90 degrees with respect to an optical axis of the at least one first reflector, wherein the at least one first reflector collimates light emitted by the at least one LED that is reflected by the first reflector parallel to the optical axis of the at least one first reflector, wherein the LED plane comprises a plane located at a mounting position of the at least one LED and is perpendicular to a central light emitting axis of the at least one LED;
positioning at least one second reflector above the LED plane and the at least one LED, wherein the at least one second reflector comprises a substantially planar surface along an axis substantially parallel to the optical axis of the at least one first reflector and the LED plane, wherein the at least one second reflector is positioned to reflect light that is emitted from the at least one LED in a downward direction that would not reflect off of the at least one first reflector;
positioning at least one lens below the LED plane; and
transmitting light from the at least one LED onto the at least one first reflector and the at least one second reflector, wherein at least one lens collimates light reflected by the at least one second reflector.

* * * * *